(12) United States Patent  
Bataweel et al.

(10) Patent No.: US 11,104,838 B2  
(45) Date of Patent: Aug. 31, 2021

(54) COMPOSITION AND METHOD FOR WATER AND GAS SHUT-OFF IN SUBTERRANEAN FORMATIONS

(71) Applicants: Saudi Arabian Oil Company, Dhahran (SA); Akzo Nobel Chemicals International B.V., BM Arnhem (NL)

(72) Inventors: Mohammed Abudullah Bataweel, Dhahran (SA); Jin Huang, Dhahran (SA); Ayman Mohammed Almohsin, Dhahran (SA); Prasad Baburao Karadkar, Dhahran (SA); Hans Olof Lagnemo, Gothenburg (SE); Andreas Ake Sundblom, Alingsås (SE); Per Anders Restorp, Sävedalen (SE)

(73) Assignees: Saudi Arabian Oil Company, Dhahran (SA); Akzo Nobel Chemicals International B.V., Arnhem (NL)

( * ) Notice: Subject to any disclaimer, the term of this patent is extended or adjusted under 35 U.S.C. 154(b) by 332 days.

(21) Appl. No.: 15/978,922

(22) Filed: May 14, 2018

(65) Prior Publication Data

US 2018/0327648 A1 Nov. 15, 2018

Related U.S. Application Data

(60) Provisional application No. 62/506,193, filed on May 15, 2017.

(30) Foreign Application Priority Data

Jun. 9, 2017 (EP) .................................... 17175344  
Apr. 9, 2018 (EP) .................................... 18166420

(51) Int. Cl.  
*C09K 8/44* (2006.01)  
*E21B 33/138* (2006.01)  
(Continued)

(52) U.S. Cl.  
CPC .............. *C09K 8/44* (2013.01); *C04B 14/062* (2013.01); *C04B 28/24* (2013.01);  
(Continued)

(58) Field of Classification Search  
CPC . C09K 8/44; C09K 8/42; C09K 8/506; C09K 8/68; C09K 8/86; C09K 8/467; C09K 8/426; E21B 33/138  
See application file for complete search history.

(56) References Cited

U.S. PATENT DOCUMENTS 2,630,410 A 3/1953 Clapsadle et al.  
3,747,677 A 7/1973 Richardson  
(Continued)

FOREIGN PATENT DOCUMENTS

CN 105801783 7/2016  
CN 105924599 9/2016  
(Continued)

OTHER PUBLICATIONS

Wu et al., "Poly(2-acrylamide-2-methylpropanesulfonic acid)-modified Si0 2 Nanoparticles for Water-based Muds," American Chemical Society—Industrail and Engineering Chemistry Research, vol. 56, No. 1, Dec. 20, 2016, 7 pages.  
(Continued)

*Primary Examiner* — Margaret G Moore  
(74) *Attorney, Agent, or Firm* — Fish & Richardson P.C.

(57) ABSTRACT

A composition useful for subterranean water or gas shut off applications includes organosilane-modified colloidal silica and an accelerator. The accelerator includes one or more organic or inorganic salts. A method of using a composition, including an organosilane-modified colloidal silica and an accelerator, includes forming a fluid system that is flowed to a formation in a subterranean zone, such as through a  
(Continued)

wellbore, where the composition forms a gel to plug the formation and shut off water flow into the wellbore.

43 Claims, 6 Drawing Sheets

(51) Int. Cl.
*C09K 8/42* (2006.01)
*C09K 8/68* (2006.01)
*C09K 8/86* (2006.01)
*C09K 8/506* (2006.01)
*C04B 28/24* (2006.01)
*C09K 8/467* (2006.01)
*C04B 14/06* (2006.01)
*C04B 40/00* (2006.01)

(52) U.S. Cl.
CPC .......... *C04B 40/0039* (2013.01); *C09K 8/426* (2013.01); *C09K 8/467* (2013.01); *C09K 8/506* (2013.01); *C09K 8/68* (2013.01); *C09K 8/86* (2013.01); *E21B 33/138* (2013.01)

(56) References Cited

U.S. PATENT DOCUMENTS

| | | | |
|---|---|---|---|
| 4,624,870 | A | 11/1986 | Anthony |
| 4,732,213 | A | 3/1988 | Bennett et al. |
| 4,927,749 | A | 5/1990 | Dorn |
| 5,125,456 | A | 6/1992 | Hutchins et al. |
| 5,368,833 | A | 11/1994 | Johansson et al. |
| 5,836,390 | A | 11/1998 | Apps et al. |
| 5,957,203 | A | 9/1999 | Hutchins et al. |
| 7,013,973 | B2 | 3/2006 | Danican et al. |
| 7,273,101 | B2 | 9/2007 | Davies et al. |
| 7,458,424 | B2 | 12/2008 | Odeh et al. |
| 7,954,549 | B2 | 6/2011 | Lende et al. |
| 9,045,965 | B2 | 6/2015 | Patil et al. |
| 2010/0119850 | A1* | 5/2010 | Browne .................. C09D 7/62 428/447 |

FOREIGN PATENT DOCUMENTS

| | | |
|---|---|---|
| EP | 17175344.5 | 6/2017 |
| RU | 2152967 | 7/2000 |
| RU | 2001132070 | 3/2004 |
| RU | 2008116114 | 10/2009 |
| WO | 9837014 | 8/1998 |
| WO | 1998037014 | 8/1998 |
| WO | 9936359 | 7/1999 |
| WO | 2004018381 | 3/2004 |
| WO | 2004035473 | 4/2004 |
| WO | 2004035474 | 4/2004 |
| WO | 2009034287 | 3/2009 |
| WO | 2010070600 | 6/2010 |
| WO | 2010130026 | 1/2012 |
| WO | 2014085770 | 6/2014 |

OTHER PUBLICATIONS

Pham et al., "Rheological evaluation of a sodium silicate gel system for water management in mature, naturally-fractured oilfields," Journal of Petroleum Science and Engineering, vol. 138, Dec. 4, 2015, 16 pages.
Huang et al., "Systematic Approach to Develop a Colloidal Silica Based Gel System for Water Shut-Off," SPE-193942-MS, Mar. 9, 2017, 19 pages.
International Search Report and Written Opinion issued in International Application No. PCT/US2018/031421 dated Aug. 3, 2018, 15 pages.
Gulf Cooperation Council Examination Report issued in GCC Application No. GC 2018-35292 dated Nov. 27, 2019, 4 pages.
Bai et al., "SPE 113997: Case Study on Preformed Particle Gel for In-depth Fluid Diversion," proceedings from the SPE/DOE Improved Oil Recovery Symposium, Apr. 19-23, 2008, 18 pages.
Dalrymple, "SPE 29194: [5]P14 Water Control Treatment Design Technology," proceedings of the 15th World Petroleum Congress, Oct. 12-17, 1997, 3 pages.
Greenwood and Gevert, "Aqueous silane modified silica sols: theory and preparation," Pigment and Resin Technology, vol. 40, Issue 5, 2011, 10 pages.
Iler and Dalton, "Degree of Hydration of Particles of Colloidal Silica in Aqueous Solution," Journal of Physical Chemistry, vol. 60, Issue 7, Jul. 1956, 3 pages.
Iller, "The Chemistry of Silica," John Wiley & Sons, Jun. 1979, 5 pages.
Lithely, "SPE 68978: Water Shut-off in Gas Wells: Is there Scope for a Chemical Treatment?," presented at the SPE European Formation Damage Conference, May 21-22, 2001, 10 pages.
Nasr-El-Din and Taylor, "Evaluation of sodium silicate/urea gels used for water shut-off treatments," Journal of Petroleum Science and Engineering vol. 48, Issue 3-4, Sep. 15, 2005, 20 pages.
Sears, "Determination of Specific Surface Area of Colloidal Silica by Titration with Sodium Hydroxide," Analytical Chemistry vol. 28, Issue 12, Dec. 1956, 3 pages.
Seright, "SPE 80200: Washout of Cr (III)-Acetate-HPAM Gels from Fractures," proceedings from the SPE International Symposium on Oilfield Chemistry, Feb. 5-7, 2003, 10 pages.
Veil et al., "A White Paper Describing Produced Water from Production of Crude Oil, natural Gas and Coal Bed methane," Technical Report prepared for the National Energy Technology Laboratory (US DOE, under Contract No. W-31-109-Eng-38, Jan. 2004, 87 pages.
Gulf Cooperation Council Examination Report issued in GCC Application No. GC 2018-35292 dated Oct. 10, 2020, 5 pages.
GCC Examination Report issued in Gulf Cooperation Council Appln. No. 2018-35292, dated May 28, 2021, 4 pages.
IN Examination Report issued in Indian Appln. No. 201917050492, dated Jun. 11, 2021, 7 pages.

\* cited by examiner

COMPOSITION AND METHOD FOR WATER AND GAS SHUT-OFF IN SUBTERRANEAN FORMATIONS

TECHNICAL FIELD

The present disclosure is directed to wellbore operations, for example, water control in wellbore applications. In particular, in some embodiments, this disclosure is directed to a composition that can block (or shut-off) water or gas ingress into a subterranean zone, such as an oil or gas well or wellbore. In some embodiments, this disclosure is directed to uses of the composition, for example in oil or gas field applications, in particular for reducing or preventing water or gas ingress into a subterranean zone, the example, a production well. This disclosure is particularly suitable for use in high temperature subterranean zones.

BACKGROUND

A common problem experienced during the extraction of mineral hydrocarbons (for example, crude oil and natural gas) from subterranean reservoirs is co-extraction of water. Water occurs naturally in oil and gas wells and reservoirs, for example, from an underlying aquifer or from injector wells, and can mix with and be extracted with the produced hydrocarbons. Co-extraction of water along with mineral hydrocarbons requires expensive separation, treatment, and disposal, which in many cases involves re-injection back into the well. Water cut is the ratio of the quantity of water produced to the total quantity of fluids produced from the production well. It is desirable to minimize the quantity of water that is brought up to the surface, that is, minimize the water cut.

Similar issues arise in oil-wells/wellbores with ingress of unwanted gas, since the gas must be separated and flared before the oil is fed to relevant storage before shipping or fed to a connected distribution pipeline. In many operations, gas handling capabilities are not readily available, so co-production of gas is ideally minimized.

There are many ways that water and gas can enter a subterranean zone, such as, for example, a wellbore or reservoir, during hydrocarbon extraction, for example through porous rock formations such as sedimentary layers or via networks of fissures or cracks that link with a source of water or gas. Various mechanical and chemical treatments can be used to prevent (for example, shut-off), or at least reduce, the ingress of water or gas. Chemical treatments include the use of gels, such as colloidal silica-based gels or gels based on polyacrylide polymers. Examples of colloidal silica-based gels are described in, for example, U.S. Pat. No. 4,732,213, U.S. Pat. No. 7,458,424, U.S. Pat. No. 7,954,549, U.S. Pat. No. 9,045,965 and WO 2009/034287. Other chemical systems, for example based on polyacrylide polymers, include those described in U.S. Pat. No. 5,125,456 and U.S. Pat. No. 5,957,203. Other applications for colloidal silica-based gel systems include consolidation/binding of particulates, for example before hydraulic fracturing, as described in U.S. Pat. No. 7,013,973.

In gel-type systems, such as colloidal silica-based gel systems, it is important to ensure that the gel time is controlled, in order to allow sufficient time for the colloidal silica to penetrate sufficiently far into the rock formation to provide a sufficient barrier, while not allowing it to penetrate too far such that dilution renders any gel barrier to be ineffective. It is also necessary for such gelling systems to function effectively under the high temperature and pressure conditions associated with subterranean hydrocarbon producing wells. Thus, although colloidal silica systems have been described for other applications, for example for forming subsurface barriers in soil for contaminant containment (U.S. Pat. No. 5,836,390), or for sealing cracks or fissures in rock, soil, roads, tunnels, bridges, or buildings (WO 2004/018381), the conditions experienced in those systems, for example, the temperatures in particular being lower, are very different than experienced in oil and gas production wells.

Thus, there exists a need for a composition for use in a subterranean zone, such as a composition that can form a gel, and methods of using such a composition, that has a controllable gel time, is stable over a wide temperature range, and can be removed if necessary, for example, by increasing the pH. Additionally, there exists a need for a composition for use in a subterranean zone, such as a composition that can form a gel, which is less harmful to the environment than organic polymer-based gels that are often used.

SUMMARY

The present disclosure provides a composition comprising a modified colloidal silica and an accelerator. At least a portion of the surface silanol groups of an unmodified colloidal silica are replaced with an organosilane moiety. The accelerator is an organic or inorganic salt including one or more cations. The silica to cation molar ratio (X) of the composition is defined by the equation:

$$X = \frac{N_{silica}}{N_{cations} \times Z^6}$$

In this equation, $N_{silica}$ is the total number of moles of silica in the composition, $N_{cations}$ is the total number of moles of cations in the composition, and Z is the charge on the cation. X is in the range of from 8 to 50.

The composition, and other aspects, can include one or more of the following features.

The organosilane moiety can include a silicon atom bound to one, two, or three $R^1$ groups by a direct Si—C bond. Each $R^1$ can be independently selected from among alkyl, epoxy alkyl, alkenyl, aryl, heteroaryl, $C_{1-6}$ alkylaryl, and $C_{1-6}$ alkylheteroaryl, optionally substituted with one or more groups selected from among $ER^2$, isocyanate, and isocyanurate. E can be absent or can be a linking group selected from the group consisting of —O—, —S—, —OC(O)—, —C(O)—, —C(O)O—, —C(O)OC(O)—, —N($R^3$)—, —N($R^3$)C(O)—, —N($R^3$)C(O)N($R^3$)—, and —C(O)N($R^3$)—. $R^2$ can be selected from the group consisting of hydrogen, F, Cl, Br, alkyl, alkenyl, aryl, heteroaryl, $C_{1-3}$ alkylaryl, and $C_{1-3}$ alkylheteroaryl, and can be optionally substituted with one or more groups selected from the group consisting of hydroxyl, F, Cl, Br, epoxy, —$OR^3$, and —N($R^3$)$_2$. $R^3$ can be H or $C_{1-6}$ alkyl.

$R^1$ can be a hydrophilic moiety or becomes hydrophilic after hydrolysis.

$R^1$ can be selected from the group consisting of hydroxyl, thiol, carboxyl, ester, epoxy, acyloxy, ketone, aldehyde, (meth)acryloxy, amino, amido, ureido, isocyanate and isocyanurate.

$R^1$ can include an epoxy group or one or more hydroxyl groups.

$R^1$ can include an $ER^2$ substituent. E can be —O—, and $R^2$ can be selected from among an optionally substituted $C_{1-8}$-epoxyalkyl and a hydroxyl-substituted alkyl.

$R^1$ can be a hydrophilic group including at least one heteroatom selected from O and N, and $R^1$ can include no more than three consecutive alkylene ($CH_2$) groups.

$R^1$ can be selected from among 3-glycidoxypropyl, 2,3-dihydroxypropoxypropyl, 2,3-dihydroxypropyl, and 2,3-dihydroxypropoxypropyl.

The modified colloidal silica can be prepared by contacting the unmodified colloidal silica with an organosilane reactant. The organosilane reactant can be selected from among a compound having the formula $T_{4-y}Si—[R^1]_y$, a siloxane having the formula $[R^1]_bT_{3-b}Si\{—O—SiT_{2-c}[R^1]_c\}_a—O—SiT_{3-b}[R^1]_b$, and a disilazane having the formula $\{[R^1]_bT_{3-b}Si\}_2—NH$, where: y is from 1 to 3; each a is independently from 0 to 5; each b is independently from 1 to 3; c is 1 or 2; and each T is independently selected from the group consisting of halide, hydroxyl, $C_{1-6}$ alkoxy, and $C_{1-6}$ haloalkoxy.

The degree of surface modification (DM) of the organosilane-modified colloidal silica can be defined by the equation:

$$DM = \frac{AN_{organosilane}}{(S_{silica} \times M_{silica} \times 10^{18})},$$

and the DM is between about 0.8 and about 4 molecules per $nm^2$, where: A is Avogadro's constant; $N_{organosilane}$ is the number of moles of organosilane reactant used; $S_{silica}$ is the surface area of the silica in the colloidal silica, in $m^2\ g^{-1}$; and $M_{silica}$ is the mass of silica in the colloidal silica, in g.

The DM can be between about 1 to about 4.

The DM can be between about 1 to about 2.

The value of X can be between about 8 to about 25, between about 8 to about 20, between about 10 to about 50, between about 10 to about 25, or between about 10 to about 20.

The accelerator can be selected from among halides, silicates, sulfates, nitrates, carbonates, carboxylates, oxalates, sulfides, hydroxides, and mixtures of any two or more of these.

The accelerator can be selected from hydroxides and silicates.

The cation of the accelerator can be selected from among alkali metal ions, alkaline earth metal ions, hydrogen ions, ammonium ions, and organoammonium ions selected from among primary, secondary, tertiary, and quaternary ammonium ions.

The cation of the accelerator can be monovalent.

The cation can be an alkali metal.

The cation can be sodium.

The cation can be potassium.

The accelerator can be selected from among sodium silicate, potassium silicate, sodium chloride, and sodium hydroxide.

The pH of the composition can be between about 6 and about 11.

The pH of the composition can be between about 9 and about 11.

The accelerator can be present in an amount of between about 1 and about 30 wt % of the composition.

The silica content of the composition can be between about 3 and about 55 wt %, expressed as weight % of the non-functionalized silica.

The accelerator can be present in an amount of between about 1 and about 30 wt % of the composition, and the silica content of the composition can be between about 3 and about 55 wt %, expressed as weight % of the non-functionalized silica.

The accelerator can cause or facilitate a reaction between the organosilane-modified colloidal silica particles in the composition, resulting in the formation of a gel in a wellbore.

The composition can form an impermeable wellbore gel.

This disclosure is also directed to a first method, combinable with any of the previous aspects, for reducing or eliminating water or gas permeation in a subterranean zone using the composition.

The first method, and other aspects, can include one or more of the following features.

The subterranean zone can be a subterranean oil well or subterranean gas well.

This disclosure is further directed to a second method, combinable with any of the previous aspects, of plugging a formation in a subterranean zone. The second method comprising mixing a modified colloidal silica with an accelerator that is an organic or inorganic salt including one or more cations to form a composition. The second method comprises flowing the composition into a wellbore to a downhole location and into the formation in the subterranean zone. The second method comprises shutting-in the wellbore for a duration of time sufficient for the composition to form a gel that is impermeable to fluid flow.

The second method, and other aspects, can include one or more of the following features.

The rate of gelation of the composition can be controlled by the amount of silica and the amount of accelerator in the composition.

In some embodiments, the composition does not form the gel until the composition reaches the downhole location.

The composition can form the gel at a desired temperature in the downhole location.

This disclosure is further directed to a third method, combinable with any of the previous aspects, of shutting-off water flow into a downhole location in a wellbore, comprising carrying out the second method, wherein the gel that is formed occupies substantially all of the internal volume of the formation.

The third method, and other aspects, can include one or more of the following features.

Portions of the subterranean zone, surrounding the formation into which the composition is to be flowed, can be sealed.

The portions of the subterranean zone can be sealed using at least one straddle packer.

This disclosure is also directed to a fourth method of shutting-off fluid flow from a formation in a subterranean zone, comprising carrying out the first method, wherein the modified colloidal silica, the accelerator, the amount of modified colloidal silica, and the amount of accelerator are selected so that the composition forms a gel when the composition is exposed to at least a certain temperature for at least a certain time, and wherein the formation in the subterranean zone is at least at the certain temperature, and the composition is retained in the formation for at least the certain time, resulting in the gel being formed in the formation, thereby shutting-off fluid flow from the formation.

The fourth method, and other aspects, can include one or more of the following features.

The silica to cation molar ratio (X) of the composition can be defined by the equation:

$$X = \frac{N_{silica}}{N_{cations} \times Z^6}$$

and the value of X can be between about 8 and about 50, where: $N_{silica}$ is the total number of moles of silica in the composition; $N_{cations}$ is the total number of moles of cations in the composition; and Z is the charge on the cation.

This disclosure is further directed to a fifth method of reducing or eliminating water or gas permeation in a subterranean zone, comprising flowing a composition including modified colloidal silica and an accelerator into a wellbore to a downhole location and into a formation in the subterranean zone. The fifth method comprises shutting-in the wellbore for a duration of time sufficient for the composition to form a gel that is impermeable to fluid flow.

The fifth method, and other aspects, can include the following feature. The subterranean zone can be a subterranean oil or gas well.

The embodiments described in this disclosure is advantageously employed in water and/or gas shut-off in wells having high bottomhole static temperature, in particular where conditions are such that unmodified silica tends to gel too quickly, and where organic polymeric modifiers tend to degrade.

BRIEF DESCRIPTION OF DRAWINGS

FIG. 1A shows a wellbore co-producing water and hydrocarbons. FIG. 1B is an illustration of implementing water control in a wellbore using a modified colloidal silica-based composition.

DETAILED DESCRIPTION

Figure 1A:
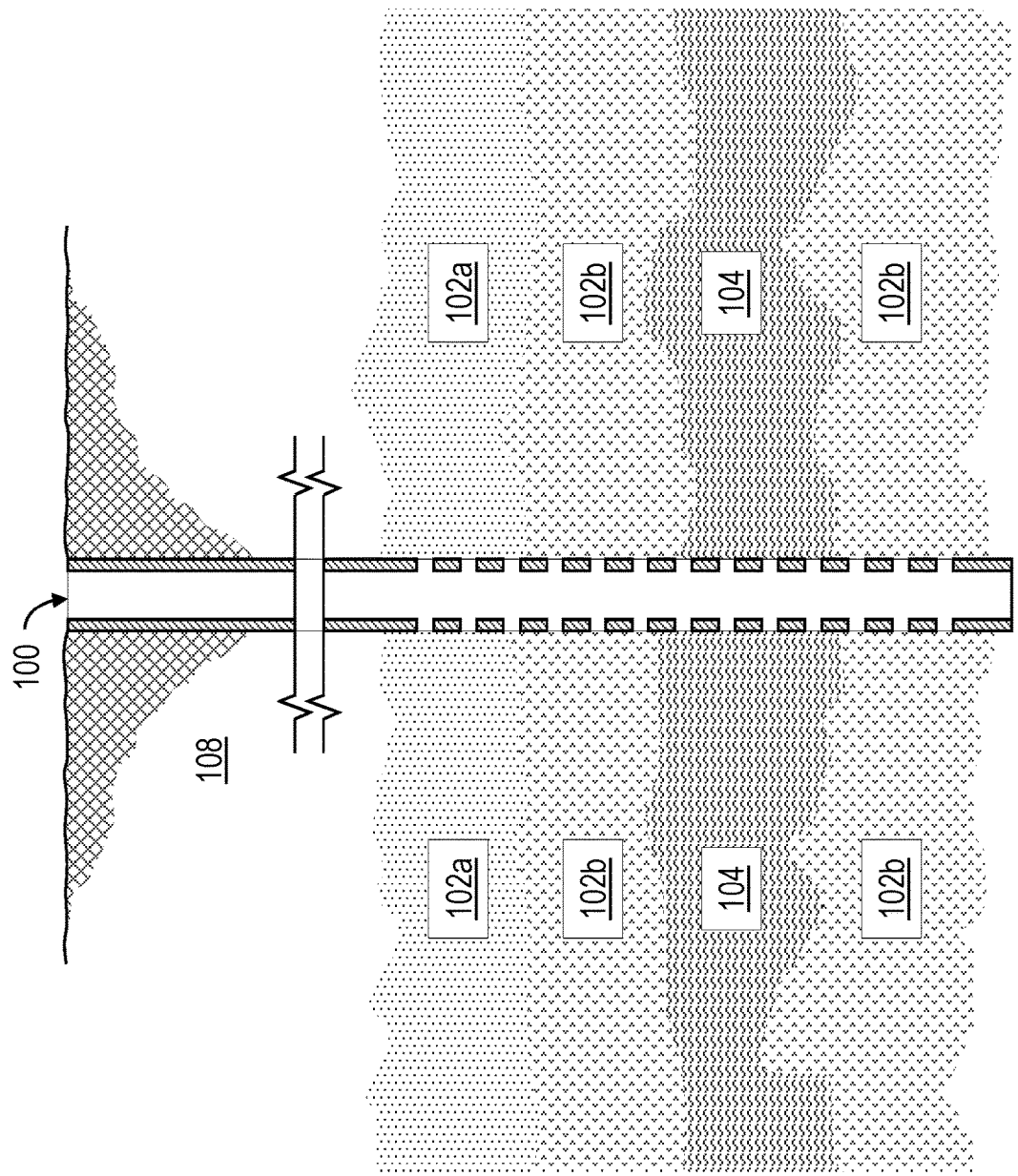
FIGS. 1A and 1B are schematic diagrams of a wellbore.

Provided in this document are compositions that contain a colloidal silica and an accelerator. In some embodiments, the colloidal silica is modified. In some embodiments, the colloidal silica is modified with an organosilane. In some embodiments, the composition that contains the colloidal silica and an accelerator forms a gel. In some embodiments, the gel is used for water and/or gas shut-off applications in subterranean zones. It has been found that the compositions of the present disclosure can improve performance in subterranean oilfield and gas-field applications for blocking ingress of unwanted fluid (typically water and/or gas) into a subterranean zone, for example an oil or gas well or wellbore. In some embodiments, the compositions provided in this document form gels by allowing a colloidal silica to penetrate into porous sediments or fissures, which then gels and hardens in the presence of an accelerator to create a barrier. Inorganic gels, such as the silica-based gels provided in this document, are generally more stable over a wider temperature range, and they can also be removed if necessary by increasing the pH, as compared to organic polymers such as polyacrylamides. In some embodiments, the compositions and methods provided in this document have environmental benefits, since colloidal silica is generally less harmful to the environment as compared to organic polymers that are often used.

In the discussion below, "organosilane-modified colloidal silica" can be referred to as an "organosilane-functionalized colloidal silica." In addition, the term "accelerator" can be referred to as an "activator."

Without wishing to be bound by any theory, it is believed that organosilane-functionalized colloidal silica particles are slower to condense compared to non-functionalized colloidal silica, which allows for better control of the condensation/gelling rate at higher temperatures, where more rapid gelling as compared to milder conditions is experienced, for example, in urban construction applications. Organosilane-functionalized colloidal silica particles are also less sensitive to electrolyte content in surrounding rock formations, which reduces the chances of uncontrolled gelling in undesired parts of the well. By improving control of the gelling, improved penetrability into permeable rock formations can be achieved, while at the same time maintaining sufficient reactivity to ensure that the reaction is sufficiently quick to ensure an effective barrier can still be provided without the penetration going too far, and thus diluting the colloidal silica to too great an extent to achieve a suitable water-block.

The compositions provided in this document contain a colloidal silica. As used in this document, the term "colloidal silica" refers to a dispersion of amorphous silica ($SiO_2$) particles having diameters of about 1 nm to about 150 nm. Colloidal silica can be obtained as a dispersion in a solvent. The solvents can include, but are not limited to, water, isopropyl alcohol (IPA), methylethylketone (MEK), N,N-dimethylformamide (DMF), and N,N-dimethylacetamide (DMAC). In some embodiments, the dispersion is an aqueous dispersion. In solvents that can perform as proton acceptors (that is, Bronsted bases, such as water, alcohols, DMF, and DMAC), the colloidal silica dispersion is charge-stabilized. The surface of colloidal silica is terminated with silanol groups (that is, Si—O—H groups). Because of the acidic nature of the proton at the end of the silanol group, a small fraction of the silanol groups ionize in a Bronsted base solvent. The colloidal silica consequently develops a negative surface charge. This charge ensures that when two colloidal silica particles approach one another, they will experience a repulsive force, and if this repulsive force is large enough, the particles will not agglomerate. Thus, colloidal silica in a Bronsted base solvent produces a dispersion that is stable to agglomeration.

In some embodiments, the colloidal silica is surface modified. In some embodiments, the colloidal silica includes colloidal silica particles in which at least a portion of the surface silanol groups are replaced with one or more chemically bound organosilane groups. In some embodiments, the chemically bound organosilane groups include a silicon atom attached to a group —$R^1$. In some embodiments, from one to three —$R^1$ groups are present on the silicon atom of the organosilane moiety. In some embodiments, there are three —$R^1$ groups. In some embodiments, there are two —$R^1$ groups. In some embodiments, there is one —$R^1$ group. Where there is more than one —$R^1$ group, they can be the same as each other or different from each other.

Organosilane-functionalized colloidal silica can be made by conventional processes, such as described in WO 2004/035473 and WO 2004/035474. In some embodiments, the organosilane-functionalized colloidal silica is formed from a reaction between an organosilane reactant and one or more silanol groups on the silica surface of the colloidal silica, that is, [SiO$_2$]—OH groups. In some embodiments, the organosilane reactant has the formula T$_{4-y}$Si—[R$^1$]$_y$. In some embodiments, each T of the organosilane reactant is independently selected from C$_{1-6}$ alkoxy, C$_{1-6}$ haloalkoxy, hydroxy and halide. In some embodiments, each T is C$_{1-6}$ alkoxy. In some embodiments, each T is methoxy. In some embodiments, each T is ethoxy. In some embodiments, there are 3 T groups and each group is ethoxy. In some embodiments, the organosilane reactant is a siloxane. In some embodiments, the siloxane is a compound of formula [R$^1$]$_b$T$_{3-b}$Si{—O—SiT$_{2-c}$[R$^1$]$_c$}$_a$—O—SiT$_{3-b}$[R$^1$]$_b$, where a is 0 or an integer of 1 or more, such as from 0 to 5, b is from 1 to 3, and c is from 1 to 2. In some embodiments, the organosilane reactant is a disilazane. In some embodiments, the disilazane is a compound of formula {[R$^1$]$_b$T$_{3-b}$Si}$_2$—NH, where b is from 1 to 3. In some embodiments, T is an alkoxy group or a halide. In some embodiments, the halide is chloride. In some embodiments, T is a haloalkoxy group, where the halo group is fluoro or chloro. In some embodiments, T is an alkoxy group. In some embodiments, the alkoxy group is a C$_{1-4}$ alkoxy group, such as methoxy, ethoxy, propoxy or isopropoxy.

In some embodiments of the organosilane reactant, R$^1$ is an organic moiety. In some embodiments, R$^1$ is selected from alkyl, alkenyl, amino, ureido, epoxy alkyl, aryl, heteroaryl, C$_{1-6}$ alkylaryl and C$_{1-6}$ alkylheteroaryl groups, any of which are optionally substituted with one or more groups selected from ER$^2$, isocyanate and isocyanurate. In some embodiments, R$^1$ includes from 1 to about 16 carbon atoms, for example from 1 to about 12 carbon atoms, or from 1 to about 8 carbon atoms. In some embodiments, R$^1$ is bound to the organosilane silicon by a direct C—Si bond. Where there is more than one R$^1$ group (that is, y is greater than 1), then each R$^1$ can be the same or different.

In some embodiments of ER$^2$, E is not present and R$^2$ is linked directly to R$^1$. In some embodiments of ER$^2$ where E is present, E is a linking group selected from —O—, —S—, —OC(O)—, —C(O)—, —C(O)O—, —C(O)OC(O)—, —N(R$^3$)—, —N(R$^3$)C(O)—, —N(R$^3$)C(O)N(R$^3$)— and —C(O)N(R$^3$)— where R$^3$ is H or C$_{1-6}$ alkyl. In some embodiments, R$^2$ is selected from halogen (such as F, Cl or Br), alkyl, alkenyl, aryl, heteroaryl, C$_{1-3}$ alkylaryl and C$_{1-3}$ alkylheteroaryl. In some embodiments, R$^2$ is substituted with one or more groups selected from hydroxyl, halogen (such as F, Cl or Br), epoxy, —OR$^3$ or —N(R$^3$)$_2$ where each R$^3$ is as defined above. In some embodiments, E is present, and R$^2$ is hydrogen.

In some embodiments, R$^1$ is selected from C$_{1-8}$ alkyl, C$_{1-8}$ haloalkyl, C$_{1-8}$ alkenyl and C$_{1-8}$ haloalkenyl. In some embodiments, R$^1$ is C$_{1-8}$ alkyl or C$_{1-8}$ alkenyl, with an optional halide substituent. In some embodiments, the halide substituent is chloride. In some embodiments, R$^1$ is selected from methyl, ethyl, chloropropyl, isobutyl, cyclohexyl, octyl and phenyl. In some embodiments, R1 is a C$_{1-8}$ group, a C$_{1-6}$ group, or a C$_{1-4}$ group.

In some embodiments, R$^1$ is an alkyl isocyanate, for example propylisocyanate. In some embodiments, R$^1$ is an isocyanurate moiety. In some embodiments, R$^1$ is a propylisocyanurate moiety.

In some embodiments, R$^1$ is a hydrophilic moiety. In some embodiments, R$^1$ is a hydrophilic moiety containing at least one group selected from hydroxyl, thiol, carboxyl, ester, epoxy, acyloxy, ketone, aldehyde, (meth)acryloxy, amino, amido, ureido, isocyanate and isocyanurate. In some embodiments, the hydrophilic moiety includes at least one heteroatom selected from O and N, and includes no more than three consecutive alkylene (—CH$_2$—) groups linked together.

In some embodiments, R$^1$ is a group comprising from 1 to 8 carbon atoms, (a C$_{1-8}$ alkyl group), and which additionally includes an ER$^2$ substituent where E is oxygen and R$^2$ is selected from optionally substituted C$_{1-8}$-epoxyalkyl and C$_{1-8}$ hydroxyalkyl. In some embodiments, R$^2$ is an optionally substituted alkylisocyanurate. Examples of such ER$^2$ substituents include 3-glycidyloxypropyl and 2,3-dihydroxypropoxypropyl.

In some embodiments, R$^1$ is a group comprising from 1 to 8 carbon atoms, (a C$_{1-8}$ alkyl group), and which additionally includes an ER$^2$ substituent where E is not present, and R$^2$ is epoxyalkyl. In some embodiments, R$^2$ is an epoxycycloalkyl. An example of such an R$^1$ group is beta-(3,4-epoxycyclohexyl)ethyl. In some embodiments, the epoxy group is two neighboring hydroxyl groups. In some embodiments, R$^2$ is a dihydroxyalkyl such as a dihydroxycycloalkyl, and R$^1$ is (3,4-dihydroxycyclohexyl)ethyl.

In some embodiments, where there is more than one R$^1$ group on the Si atom of the organosilane, at least one is a C$_{1-8}$ alkyl or alkenyl group.

In some embodiments, R$^1$ is a C$_1$-C$_6$ alkyl group. In some embodiments, R$^1$ is methyl. In some embodiments, R$^1$ is propyl. In some embodiments, R$^1$ is a ureido group (—NH—C(O)—NH$_2$). In some embodiments, R$^1$ is glycidyloxypropyl.

In the above definitions, alkyl and alkenyl groups can be aliphatic, cyclic or can include both aliphatic and cyclic portions. Aliphatic groups or portions can be linear or branched. In some embodiments, where any group or substituent includes halogen, the halogen is selected from F, Cl and Br.

In some embodiments, some groups undergo hydrolysis reactions under conditions experienced in the colloidal silica medium. Thus, in some embodiments, groups containing moieties such as halide, acyloxy, (meth)acryloxy and epoxy groups hydrolyze to form the corresponding carboxyl, hydroxyl or glycol moieties.

Examples of organosilane reactants that can be used to make the functionalized colloidal silicas described in this document include, but are not limited to, octyl triethoxysilane, methyl triethoxysilane, methyl trimethoxysilane, tris-[3-(trimethoxysilyl)propyl]isocyanurate, 3-mercaptopropyl trimethoxysilane, beta-(3,4-epoxycyclohexyl)-ethyl trimethoxysilane, silanes containing an epoxy group (epoxy silane), glycidoxy and/or a glycidoxypropyl group, such as 3-(glycidoxypropyl)trimethoxy silane (which can also be known as trimethoxy[3-(oxiranylmethoxy)propyl]silane), 3-glycidoxypropyl methyldiethoxysilane, (3-glycidoxypropyl)triethoxy silane, (3-glycidoxypropyl)hexyltrimethoxy silane, beta-(3,4-epoxycyclohexyl)-ethyltriethoxysilane; 3-methacryloxypropyl trimethoxysilane, 3-methacryloxypropyl triisopropoxysilane, 3-methacryloxypropyl triethoxysilane, octyltrimethoxy silane, ethyltrimethoxy silane, propyltriethoxy silane, phenyltrimethoxy silane, 3-mercaptopropyltriethoxy silane, cyclohexyltrimethoxy silane, cyclohexyltriethoxy silane, dimethyldimethoxy silane, 3-chloropropyltriethoxy silane, 3-methacryloxypropyltrimethoxy silane, i-butyltriethoxy silane, trimethylethoxy silane, phenyldimethylethoxy silane, hexamethyldisiloxane, trimethylsilyl chloride, ureidomethyltriethoxy silane, ureidoethyltriethoxy silane, ureidopropyltriethoxy silane, hexamethyldisilazane, and mixtures thereof. U.S. Pat. No. 4,927,749 discloses further suitable silanes which can be used in the present disclosure.

In some embodiments, the organosilane includes one or more epoxy groups. In some embodiments, the organosilane is an epoxyalkyl silane or an epoxyalkyloxyalkyl silane. In some embodiments, the organosilane includes one or more hydroxyl-substituted groups. In some embodiments, the hydroxyl-substituted groups are hydroxyalkyl or hydroxyalkyloxyalkyl groups comprising one or more hydroxyl groups, for example, 1 or 2 hydroxyl groups. Examples include, but are not limited to, organosilanes containing a glycidoxy, glycidoxypropyl, dihydropropoxy or dihydropropoxypropyl group. In some embodiments, the organosilane is derived from organosilane reactants such as (3-glycidoxypropyl)trimethoxysilane, (3-glycidoxypropyl)triethoxysilane and (3-glycidoxypropyl)methyldiethoxysilane. In some embodiments, the epoxy groups hydrolyze to form the corresponding vicinal diol groups. Therefore, in some embodiments, the compositions described in this document also encompasses the diol equivalents of the above epoxy group-containing compounds.

In some embodiments, the organosilane-functionalized colloidal silica is formed from a reaction between one or more organosilane reactants and one or more silanol groups on the silica surface of the colloidal silica. In some embodiments, the organosilane reactant is (3-glycidyloxypropyl)triethoxysilane. In some embodiments, the organosilane reactant is propyltriethoxysilane. In some embodiments, the organosilane reactant is methyltriethyoxysilane. In some embodiments, the organosilane reactant is ureidopropyltriethoxysilane. In some embodiments, the organosilane reactant is a mixture of one or more organosilane reactants. In some embodiments, the organosilane reactant is a mixture of (3-glycidyloxypropyl)triethoxysilane and propyltriethoxysilane. In some embodiments, the organosilane reactant is a mixture of about 50 mol % to about 70 mol % (3-glycidyloxypropyl)triethoxysilane and about 30 mol % to about 50 mol % propyltriethoxysilane. In some embodiments, the organosilane reactant is a mixture of about 60 mol % (3-glycidyloxypropyl)triethoxysilane and about 40 mol % propyltriethoxysilane. In some embodiments, the organosilane reactant is a mixture of (3-glycidyloxypropyl)triethoxysilane and ureidopropyltriethoxysilane. In some embodiments, the organosilane reactant is a mixture of about 40 mol % to about 60 mol % (3-glycidyloxypropyl)triethoxysilane and about 40 mol % to about 60 mol % ureidopropyltriethoxysilane. In some embodiments, the organosilane reactant is a mixture of about 50 mol % (3-glycidyloxypropyl)triethoxysilane and about 50 mol % ureidopropyltriethoxysilane.

In some embodiments, the organosilane reactant undergoes a prehydrolysis step, in which one or more T groups are converted to —OH, as described for example by Greenwood and Gevert, Pigment and Resin Technology, 2011, 40(5), pp 275-284.

In some embodiments, reaction between an organosilane reactant and one or more silanol groups on the silica surface of the colloidal silica results in one or more organosilane groups chemically bound to the surface of the colloidal silica. In some embodiments, all of the organosilane groups are the same. In some embodiments, the organosilane groups are different. In some embodiments, the chemically bound organosilane groups are represented by the formula $[\{SiO_2\}—O—]_{4-y-z}[Z]_z$ Si—$[R^1]_y$, where —O— of the group $\{SiO_2\}$—O— represents an oxygen atom on the silica surface. In some embodiments, the organosilane silicon atom has at least one, and up to three such bonds to the silica surface, that is, 4-y-z is at least 1, and no more than 3. In some embodiments, group Z is present. In some embodiments, z is in the range of from 0 to 2. In some embodiments, the organosilane silicon atom has from 1 to 3 $[R^1]$ groups, that is, y is from 1 to 3, or from 1 to 2. Where there is more than 1 $R^1$ group, they can be the same or different.

In some embodiments, when z is not zero, the organosilane silicon contains unreacted T groups, and/or contains hydroxyl groups where the T group has been removed. In some embodiments, the T group is removed through a hydrolysis reaction. In some embodiments, an Si—O—Si link can be formed with the silicon atom of a neighboring organosilane group. Thus, in some embodiments, in the formula $\{[SiO_2]—O-\}_{4-y-z}[Z]_z$ Si—$[R^1]_y$, group Z is independently for each occurrence selected from the groups defined for T above, and also from hydroxy groups and —O—$[SiR^1]'$ groups where the $[SiR^1]'$ group is a neighboring organosilane group.

In some embodiments, the organosilane reactant reacts with a surface silanol group to form from one to three Si—O—Si links between the silica surface of the colloidal silica and a silicon atom of the organosilane reactant. In some embodiments, a compound is formed that has the formula $\{[SiO_2]—O-\}_{4-y-z}[T]_z$ Si—$[R^1]_y$, where 4-y-z is from 1 to 3, such as from 1 to 2, and a corresponding number of T groups are removed from the organosilane as a result. For example, if T is an alkoxy unit, an alcohol will be produced.

In some embodiments, at least a portion of the organosilane reactant is in a dimeric form or even oligomeric form before binding to the colloidal silica. In some embodiments, two or more organosilane reactant moieties are bound to each other through Si—O—Si bonds.

In some embodiments, the modified (or "functionalized") colloidal silica contains more than one organosilane that are different from each other, for example where the organosilane-modified silica is produced by reacting a mixture of two or more organosilanes with colloidal silica, or by mixing two or more separately prepared organosilane-modified colloidal silicas.

In some embodiments, the organosilane compounds form stable covalent siloxane bonds (Si—O—Si) with the silanol groups of the colloidal silica. In some embodiments, the organosilane compounds are linked to the silanol groups by hydrogen bonds, on the surface of the colloidal silica particles. In some embodiments, not all silica particles of the colloidal silica become modified by the organosilane group. The proportion of colloidal silica particles that become functionalized with the organosilane group can depend on a variety of factors, for example, the size of the silica particles and the available surface area, the relative amounts of organosilane reactant to colloidal silica used to functionalize the colloidal silica, the type of organosilane reactants used, and the reaction conditions.

In some embodiments, the degree of modification (DM) of the silica surface by the organosilane group is expressed according to the following calculation (Equation 2), in terms of the number of silane molecules per square nanometer of silica surface:

$$DM = \frac{A \times N_{organosilane}}{(s_{silica} \times M_{silica} \times 10^{18})} \quad \text{Equation 2}$$

wherein:

DM is the degree of surface modification in units of per square nanometers (nm$^{-2}$);

A is Avogadro's constant;

$N_{organosilane}$ is the number of moles of organosilane reactant used;

$S_{silica}$ is the surface area of the silica in the colloidal silica, in square meters per gram (m² g⁻¹); and $M_{silica}$ is the mass of silica in the colloidal silica, in grams (g).

In some embodiments, the surface area of the silica is conveniently measured by Sears titration.

In some embodiments, the DM can be at least 0.8 molecules of silane per nm², such as in the range of from 0.8 to 4 molecules per nm². In some embodiments, the DM is in the range of from 1 to 3, for example from 1 to 2 molecules per nm².

The colloidal silica used in the composition of the present disclosure is a stable colloid. By "stable" is meant that the organosilane-functionalized colloidal silica particles dispersed in the medium do not substantially gel or precipitate within a period of at least 2 months, or at least 4 months, or at least 5 months at normal storage at room temperature (20° C.).

In some embodiments, the relative increase in viscosity of the silane-functionalized colloidal silica dispersion between its preparation and up to two months after preparation is lower than 100%, such as lower than 50 or lower than 20%. In some embodiments, the relative increase in viscosity of the silane-functionalized colloidal silica between its preparation and up to four months after preparation is lower than 200%, such as lower than 100%, or lower than 40%.

In some embodiments, the silica particles within the silica sols (colloidal silicas) are modified with one or more additional oxides in addition to modification of the organosilane. In some embodiments, the additional oxide is an aluminum oxide or boron oxide. Boron-modified silica sols are described in, for example, U.S. Pat. No. 2,630,410. In some embodiments, alumina-modified silica particles have an $Al_2O_3$ content of from about 0.05 to about 3 weight percent (wt %), for example from about 0.1 to about 2 wt %. The procedure of preparing an alumina-modified silica sol is described, for example, in "The Chemistry of Silica," by Iler, K. Ralph, pages 407-409, John Wiley & Sons (1979) and in U.S. Pat. No. 5,368,833.

In some embodiments, the silica in the colloidal silica does not contain any added additional oxides. In some embodiments, the colloidal silica contains no more than trace or impurity amounts in each case, for example less than 1000 parts per million (ppm) by weight each of additional oxides. In some embodiments, the total amount of non-silica oxides present in the sol is less than about 5000 ppm by weight, such as less than about 1000 ppm.

In some embodiments, the colloidal silica particles have an average particle diameter ranging from about 2 to about 150 nm, such as from about 3 to about 50 nm, or from about 5 to about 25 nm. In some embodiments, the average particle diameter is in the range of from about 6 to about 20 nm. In some embodiments, the colloidal silica particles have a specific surface area from about 20 to about 1500 m² g⁻¹, such as from about 50 to about 900 m² g⁻¹, from about 70 to about 600 m² g⁻¹, or from about 70 to about 400 m² g⁻¹. The surface areas expressed in this document are based on measurements by Sears titration (G. W. Sears, Anal. Chem., 1956, 28(12) pp. 1981-1983) of the "bare" or "non-functionalized" colloidal silicas that are used for the synthesis. This is because functionalization of a silica surface can complicate the Sears titration measurements. In some embodiments, the particle diameter is calculated from the titrated surface area, for example, by using a method described in "The Chemistry of Silica," by Iler, K. Ralph, page 465, John Wiley & Sons (1979). In some embodiments, it is assumed that the silica particles have a density of 2.2 grams per cubic centimeter (g cm⁻³), and that all particles are of the same size, have a smooth surface area and are spherical, then the particle diameter can be calculated from Equation 3:

$$\text{Particle diameter(nm)} = \frac{2720}{\text{Surface Area}(m^2 g^{-1})} \qquad \text{Equation 3}$$

In some embodiments, the colloidal silica particles are dispersed in water in the presence of stabilizing cations. In some embodiments, the stabilizing cations are selected from $K^+$, $Na^+$, $Li^+$, $NH_4^+$, organic cations, quaternary amines, tertiary amines, secondary amines, and primary amines, or mixtures thereof so as to form an aqueous silica sol. In some embodiments, the dispersions include organic solvents. In some embodiments, the organic solvents are those that are water miscible, for example, lower alcohols, acetone, or mixtures thereof. In some embodiments, the organic solvent is present in a volume ratio to water of 20% or less. In some embodiments, no solvents are added to the colloidal silica or functionalized colloidal silica. In some embodiments, organic solvents in the composition can arise during synthesis of the organosilane-functionalized colloidal silica due to reaction of an organosilane reactant with the silica. For example, if the organosilane reactant is an alkoxide, then the corresponding alcohol will be produced. In some embodiments, the amount of any organic solvent is kept below about 20% by weight, such as less than about 10% by weight.

In some embodiments, the silica content of the functionalized silica sol, before mixing with the accelerator, is in the range of from about 5 to about 60% by weight, such as from about 10 to about 50%, or from about 15 to about 45%. This is expressed as weight % of non-functionalized silica, and is calculated from the weight % of silica in the colloidal silica source before modification with organosilane. In some embodiments, in the presence of an accelerator, the content of silica in the final composition is in the range of from about 3 to about 58 wt %, for example from about 10 to about 55 wt %, such as from about 15 to about 50 wt %, expressed as weight % of non-functionalized silica (that is, as $SiO_2$).

In some embodiments, the pH of the functionalized silica sol is in the range of from about 1 to about 13, such as from about 2 to about 12, from about 4 to about 12, from about 6 to about 12, or from about 7.5 to about 11. In some embodiments, where the silica is aluminum-modified, the pH is in the range of from about 3.5 to about 11.

In some embodiments, the functionalized colloidal silica, before being mixed with accelerator, has an S-value from about 20 to about 100, such as from about 30 to about 90, or from about 60 to about 90. The S-value characterizes the extent of aggregation of colloidal silica particles, for example, the degree of aggregate or microgel formation. In some embodiments, the S-value is measured and calculated according to the formulae given in Iler, R. K. & Dalton, R. L. in J. Phys. Chem., 60 (1956), 955-957. The S-value is dependent on the silica content, the viscosity, and the density of the colloidal silica. A high S-value indicates a low microgel content. The S-value represents the amount of $SiO_2$ in percent by weight present in the dispersed phase of a silica sol. In some embodiments, the degree of microgel formation can be controlled during the production process, such as described in, for example, U.S. Pat. No. 5,368,833. The S-value for organosilane-functionalized colloidal silica is typically quoted as the S-value of the "bare" or "non-functionalized" colloidal silicas that are used for the synthesis (similar to the surface areas expressed in this document).

In some embodiments, the weight ratio of organosilane to silica in the silane-functionalized silica sol is from about 0.003 to about 1.5, such as from about 0.006 to about 0.5, or from about 0.015 to about 0.25. In some embodiments, the weight of organosilane in the dispersion is calculated as the total amount of possible free organosilane compounds and organosilane derivatives or groups bound or linked to the silica particles, for example, based on the total amount of organosilane reactant(s) initially added to the colloidal silica to produce the organosilane modified silica, and not necessarily based on a direct measure of how much organosilane is actually chemically bound to the silica.

The compositions provided in this document contain an accelerator. In some embodiments, the accelerator is able to cause or facilitate reactions that cause colloidal silica particles to react together, resulting in formation of a gel. In some embodiments, the accelerator is capable of accelerating the gelling of the (organosilane-modified) colloidal silica. In some embodiments, the accelerator causes the colloidal silica particles to react together and results in increased viscosity of the composition. In some embodiments, more than one accelerator is used.

In some embodiments, the accelerator is a salt. In some embodiments, the accelerator is an organic salt. In some embodiments, the accelerator is an inorganic salt. In some embodiments, the salt is selected from halides, silicates, sulfates, nitrates, carbonates, carboxylates, oxalates, sulfides, and hydroxides. In some embodiments, the salt is a halide, hydroxide or silicate. In some embodiments, the halide is chloride.

In some embodiments, the accelerator includes an anion. In some embodiments, the anion is selected from a halide (such as chloride, bromide or iodide), carbonate, hydroxide, sulfate, nitrate, silicate, aluminate, phosphate, hydrogen phosphate, carboxylate, or oxalate. In some embodiments, the accelerator includes a cation. In some embodiments, the cation is selected from alkali metals, alkaline earth metals, hydrogen, main group metals (for example, aluminum, gallium, indium, or tin), ammonium ions, including primary ammonium, secondary ammonium, tertiary ammonium, and quaternary ammonium ions, and organic cations such as amino and organoamino ions. In some embodiments, the cation is a proton, for example, an acid is used as the accelerator. In some embodiments, the cation is monovalent. In some embodiments, the alkali metal is selected from sodium or potassium.

In some embodiments, the accelerator is an inorganic salt. Examples of inorganic salts include, but are not limited to, aluminum chloride, aluminum nitrate, aluminum sulfate, potassium chloride, calcium chloride and other calcium donors such as cement, sodium chloride, and magnesium chloride, magnesium sulfate, potassium iodide, sodium hydrogen phosphate, magnesium nitrate, sodium nitrate, potassium nitrate, calcium nitrate, potassium silicate, sodium silicate, and mixtures thereof.

In some embodiments, the accelerator is a silicate. In some embodiments, the accelerator is sodium silicate or potassium silicate. In some embodiments, the accelerator is sodium chloride. In some embodiments, the accelerator is a hydroxide. In some embodiments, the accelerator is an alkali metal hydroxide, ammonium hydroxide or organoammonium hydroxide.

In some embodiments, the cation of the accelerator is a monovalent cation. In some embodiments, the monovalent cation is an alkali metal cation, ammonium ion, or organoammonium ion. In some embodiments, the monovalent cation is an alkali metal cation. In some embodiments, the alkali metal cation is lithium, sodium, or potassium.

In some embodiments, the accelerator includes an alkali metal silicate. In some embodiments, the alkali metal silicate contains one or more of potassium, sodium, and lithium. In other embodiments, an organic silicate is used. In some embodiments, the organic silicate contains an amino or ammonium cation. In some embodiments, the molar ratio of $SiO_2/M_2O$, wherein M is sodium or potassium is about 1 to about 4. In some embodiments, the molar ratio of $SiO_2/M_2O$, wherein M is lithium or an organic component, is from about 1 to about 20.

In some embodiments, the accelerator is sodium silicate. In some embodiments, the sodium silicate accelerator is in aqueous form having an $SiO_2$ concentration of about 20 wt % to about 30 wt % and sodium content (expressed as $Na_2O$) of about 5 wt % to about 10 wt %. In some embodiments, the sodium silicate accelerator is in aqueous form having an $SiO_2$ concentration of about 24.2 wt % and sodium content (expressed as $Na_2O$) of about 7.3 wt %.

In some embodiments, the accelerator is potassium silicate. In some embodiments, the potassium silicate accelerator is in aqueous form having an $SiO_2$ concentration of about 20 wt % to about 30 wt % and potassium content (expressed as $K_2O$) of about 10 wt % to about 15 wt %. In some embodiments, the potassium silicate accelerator is in aqueous form having an $SiO_2$ concentration of about 23.8 wt % and potassium content (expressed as $K_2O$) of about 11 wt %.

In some embodiments, the accelerator is sodium chloride. In some embodiments, the sodium chloride accelerator is in aqueous form. In some embodiments, the sodium chloride accelerator is an aqueous solution of about 5 wt % to about 30 wt % sodium chloride. In some embodiments, the sodium chloride accelerator is a 10 wt % aqueous solution. In some embodiments, the sodium chloride accelerator is a 25 wt % aqueous solution.

In some embodiments, the accelerator is sodium hydroxide. In some embodiments, the sodium hydroxide accelerator is in aqueous form. In some embodiments, the sodium chloride accelerator is an aqueous solution of about 5 wt % to about 15 wt % sodium hydroxide. In some embodiments, the sodium hydroxide accelerator is a 10.3 wt % aqueous solution.

In some embodiments, the accelerator is soluble, or at least partially soluble, in the composition at room temperature (for example, 15-25° C.) and/or at subterranean wellbore temperatures, for example, in the range of from about 90 to about 200° C.

In some embodiments, the content of accelerator in the composition is in an amount of from about 1 to about 30 wt %, such as from about 2 to about 15 wt % of the total dry weight of silicate and silica particles.

In some embodiments, the silica to cation molar ratio (X) of the composition of the present disclosure is represented by Equation 1.

$$X = \frac{N_{silica}}{N_{cations} \times Z^6} \qquad \text{Equation 1}$$

In this equation, $N_{silica}$ is the number of moles of silica, $N_{cations}$ is the number of moles of cations, and Z is the charge on the cation.

In some embodiments, X is in the range of from about 8 to about 50. In some embodiments, the amount of accelerator in the composition is selected so as to achieve an X ratio in this range. In some embodiments, X is in the range of from about 8 to about 25, for example from about 8 to about 20. In other embodiments, X is about 10 to about 50, for example from about 10 to about 25 or from about 10 to about 20. The number of moles of silica in this calculation includes not only silica from the colloidal silica source, but also any silica present in the accelerator. For example, if the accelerator is a silicate such as sodium or potassium silicate, the silica content includes the silicate from the accelerator. Thus, the number of moles of silica is based on the silica or silicate present in the source of colloidal silica and any silica or silicate present in the accelerator. In some embodiments, this ensures that gelling is not too quick for subterranean water shut-off requirements, while also ensuring that gelling takes place to a sufficient extent to ensure sufficiently quick gelling characteristics and good gel strength such that an effective barrier is maintained.

In some embodiments, aqueous colloidal silica is made with salts present in the aqueous medium, such as sodium or potassium silicate. These cations are also included in the number of moles of cations in the above equation. Thus, in some embodiments, the number of moles of cations includes any cations present in the accelerator, and also any cations present in the source of colloidal silica. In some embodiments, the cations in the silica source are determined by methods such as X-ray fluorescence.

Where there is more than one different type of cation in the composition, the above can be expressed over the sum of all different types of cation thus:

$$X = \frac{N_{silica}}{\sum_{i=1}^{n} (N_{cation} \times Z^6)_i} \qquad \text{Equation 4}$$

where each "i" represents a different cation and n is the total number of different cations.

In some embodiments, Z is 1 in all cases, that is, all cations are monovalent.

In some embodiments, the compositions provided in this document are aqueous and are liquid at standard temperature and pressure. In some embodiments, organic solvents such as lower alcohols, acetone or mixtures thereof are present, although in minor amounts compared to water.

The compositions provided in this document contain a colloidal silica, such as a modified colloidal silica described in this document, and an accelerator. The compositions are fluid compositions that can form a gel. In some embodiments, the compositions form a gel in a subterranean oil or gas well. In some embodiments, the compositions of the disclosure have gelling times that are suitable for use in subterranean oil and gas wells, where temperatures are 90° C. or more, and often over 100° C., such as 110° C. or more. Example temperature ranges where the compositions are suitable for use include from about 90 to about 200° C., from greater than about 100° C. to about 200° C. and from about 110° C. to about 180° C. In some embodiments, the gel times are longer than would otherwise be experienced using non-functionalized colloidal silica, but which are still effective for use in water and gas shut off applications in subterranean geological formations, for example in crude oil and natural gas wells.

In some embodiments, the compositions have gelling times of about 1 hour or more at a temperature of 120° C. In some embodiments, the compositions have gelling times of no more than 48 hours at a temperature of 120° C. In some embodiments, the compositions have gelling times from about 1 hour to about 48 hours, or about 1 hour to about 24 hours, such as about 1 hour, about 2 hours, about 3 hours, about 4 hours, about 5 hours, about 10 hours, about 12 hours, about 16 hours, about 20 hours, about 24 hours, about 30 hours, about 36 hours, about 42 hours, or about 48 hours.

In some embodiments, the gelling time of the composition can be controlled. In systems where non-functionalized colloidal silica is used, low amounts of accelerator are typically required, and the gelling time is very sensitive to changes in the amounts of accelerator salt, especially under high temperature conditions typically experienced in subterranean oil and gas wells. Therefore, if the amounts used are not accurately controlled, the gelling time can easily fall outside the desired time window. In addition, there is also a risk of uncontrolled or premature gelling if contact is made with electrolytes that exist in the subterranean rock formations. By contrast, in some embodiments, the compositions described in this document are less sensitive to variations in the amount of accelerator under such conditions. In some embodiments, there is greater tolerance for variations in the amounts used, and the presence of down-well electrolytes.

In some embodiments, control of gel times can be achieved by tailoring the ratio of the colloidal silica to accelerator in the composition. In some embodiments, the optimum ratio depends on the nature of the organosilane group(s), and on the conditions and nature of the porous rock formations that are involved.

In some embodiments, the composition includes an organosilane-modified colloidal silica and a salt accelerator. These compositions represent a non-toxic and environmentally friendly approach to achieve water and/or gas shut-off compared to certain known chemical systems.

Also provided in this document are methods of reducing or eliminating water or gas permeation in subterranean zones, for example in a subterranean oil or gas well. The methods provided in this document include using the compositions described herein to form a gel in a subterranean zone. In some embodiments, the gel is impermeable to fluid flow. Because it can be challenging to get a perfectly impermeable barrier, the term "impermeable" as used in this document includes systems where small, insubstantial levels of fluid permeation can occur.

Provided in this document is a method for plugging a formation in a subterranean zone. In some embodiments, the method includes forming a composition comprising a modified colloidal silica and an accelerator; flowing the composition into a wellbore to a downhole location and into the formation in the subterranean zone; and shutting-in the wellbore for a duration sufficient for the composition to form a gel that is impermeable to fluid flow. In some embodiments, the rate of gelation of the composition is controlled by the amount of modified colloidal silica and amount of accelerator in the composition. In some embodiments, the composition does not form a gel until the composition reaches the downhole location. In some embodiments, the composition does not form a gel until the composition reaches a downhole location that has a certain temperature.

Also provided in this document is a method for shutting off water flow into a downhole location in a wellbore. In some embodiments, the method includes forming a composition comprising a modified colloidal silica and an accelerator; flowing the composition into a wellbore to a downhole location and into the formation in the subterranean zone; and shutting-in the wellbore for a duration sufficient for the composition to form a gel that is impermeable to fluid flow. In some embodiments, the gel occupies substantially all of the internal volume of the formation. In some embodiments, the method includes sealing portions of the subterranean zone surrounding the formation into which the composition is to be flowed. In some embodiments, the portions of the subterranean zone are sealed with at least one straddle packer.

Also provided in this document is a method for shutting off fluid flow from a formation in a subterranean zone. In some embodiments, the method includes forming a composition comprising a modified colloidal silica and an accelerator; flowing the composition into a wellbore to a downhole location and into the formation in the subterranean zone; and shutting-in the wellbore for a duration sufficient for the composition to form a gel that is impermeable to fluid flow. In some embodiments, the composition forms a gel after the composition is exposed to a certain temperature for a certain amount of time. In some embodiments, the subterranean zone is at a temperature sufficient to allow the composition to form a gel.

In some embodiments of the methods described in this document, the amount of modified colloidal silica and the amount of accelerator are selected such that the rate of gelation of a composition described in this document is controlled. In some embodiments, the modified colloidal silica and the accelerator do not form a gel until the composition reaches the downhole location. In some embodiments, the amounts are selected based on Equations 1 and 4 above. In some embodiments, the amounts are selected such that the composition forms the gel at a temperature of the downhole location.

In some embodiments, the method is implemented as a method of shutting-off water flow into a downhole location in a wellbore. In some embodiments, a composition according to this disclosure is flowed into a wellbore to a downhole location inside a formation in a subterranean zone in which the wellbore is formed. In some embodiments, the wellbore is shut-in for a duration sufficient for the modified colloidal silica and the accelerator (the composition) to form a gel that is impermeable to water flow. In some embodiments, the gel occupies substantially all of the internal volume of the formation.

In some embodiments, portions of the subterranean zone surrounding the formation into which the composition is to be flowed are sealed. In some embodiments, the portions are sealed using at least one straddle packer.

In some embodiments, the method is implemented as a method of shutting-off fluid flow from a formation in a subterranean zone. In this method, the various aspects of the composition (for example, the modified colloidal silica, the accelerator, and their quantities) are selected to form a gel when the composition is exposed to at least a certain temperature for at least a certain time. In some embodiments, the composition according to this disclosure is flowed to a formation in a subterranean zone, where the formation is at least at the certain temperature. In some embodiments, the composition is retained in the formation for at least the certain time resulting in the gel being formed in the formation. In some embodiments, the gel shuts off the fluid flow from the formation.

In some embodiments of present disclosure, a wellbore is formed in the subterranean zone. In some embodiments, the wellbore extends at least to the formation. In some embodiments, the composition is flowed to the formation through the wellbore.

In some embodiments, the composition is a non-toxic, environmentally friendly formulation that includes an organosilane-modified silica and an accelerator that causes gelation, of which a composition according to the present disclosure is an example. In some embodiments, the composition is placed within the wellbore, for example in targeted formation zones, as a single phase, low-viscosity solution. At these depths, the wellbore temperature can be high. In some embodiments, the use of the modified colloidal silica allows the composition to operate at these elevated temperatures (for example, temperatures can reach up to 350° F./177° C.) by allowing better control of gelation time.

In some embodiments, the gelation process is activated by the formation temperature. In some embodiments, the formation temperature is the temperature inside the desired location in the subterranean zone. In some embodiments, in situ gelation takes place to plug (partially or completely) pore spaces, thereby limiting undesired water production. In some embodiments, the internal volume of the formation into which the composition is flowed is substantially plugged by the gel that forms within the formation. In some embodiments, substantial plugging results in fluid in the formation (for example water, gas or other fluid) not being able to escape into the wellbore. In some embodiments, the chemical concentration or the quantity of accelerator (or both) can be used to control gelation time, thereby allowing a predictable and controllable pumping time, ranging from a few minutes to several hours at a given temperature.

The composition will now be described with reference to water shut-off, although the same principles apply for shut-off of other fluids, for example, gas shut-off.

FIG. 1A is a schematic diagram of a wellbore (100) co-producing water (104) and hydrocarbons, for example gas (102a), oil (102b), or both. In some embodiments, the wellbore (100) is formed by implementing wellbore drilling operations in a subterranean zone (108) carrying hydrocarbons. In some embodiments, the subterranean zone (108) includes a formation, a portion of a formation, or multiple formations. For example, the subterranean zone (108) in which the wellbore (100) is formed includes a formation carrying hydrocarbons, for example gas (102a) and oil (102b), and a formation carrying water (104).

The example wellbore (100) is shown as a vertical wellbore. The wellbore (100) can be or can include horizontal, vertical, slant, curved or other types of geometries and orientations. The wellbore (100) can include a casing that is cemented or otherwise secured to the wellbore wall. In some embodiments, the wellbore can be uncased, or can include uncased sections. When cased, perforations can be formed in the casing to allow fluids from the formations to flow into the wellbore (100) and to the surface of the wellbore (100).

In some instances, fracture treatments can be used, for example, to form or propagate fractures in the subterranean zone (108) to create fluid flow pathways in the zone through which the fluid can flow into the wellbore (100). In some instances, injection treatment can be used to inject water into injection wellbores formed adjacent to the wellbore (100). The injected water can force the hydrocarbons surrounding the wellbore (100) to flow into the wellbore (100) when the pressure in the subterranean zone (108) is insufficient to do so.

Drilling through multiple formations in the subterranean zone, either by itself or in combination with a fracture treatment or an injection treatment, can result in the hydrocarbons (102a, 102b) and the water (104) flowing into the wellbore (100). The co-produced fluids can flow to the surface where the water can be separated from the fluids and either disposed or re-injected into the subterranean zone. Water shut-off is the process of decreasing or eliminating the flow of water (104) into the wellbore (100).

Gel treatment is one technique to implement water and/or gas shut-off. For known compositions, gelation can occur at temperatures that are lower than the temperature at which water the shut-off operation is to be implemented. For example, the water shut-off may need to be implemented deep within the wellbore at which the formation temperature is high. The composition, on the other hand, may trigger gelation at a temperature lower than the formation temperature. In such instances, premature gelation can result in plugging of the tubular through which the composition is pumped downhole. The premature gelation, in turn, can result in a pressure build up while pumping water.

By contrast, the compositions described in this document, comprising an organosilane-modified colloidal silica and a salt as an accelerator allow for delayed gelation until the higher temperatures are reached. Consequently, the compositions described in this document can be flowed to formation areas with elevated temperatures before gelation occurs. Similarly, in other high-temperature applications, gelation can be delayed until the elevated temperatures are reached. By doing so, sufficient time can be given for the composition to penetrate deeper inside the formation where the gel needs to be disposed.

In some embodiments, a gel for high-temperature water and/or gas shut-off or other high temperature application can be formed by using a composition comprising colloidal silica modified by an organosilane (for example, as described above) and an accelerator, which is a salt (for example, as described above). In an embodiment, the organosilane is a trialkoxy[3-(oxiranylmethoxy)propyl]silane. In some embodiments, the trialkoxy[3-(oxiranylmethoxy)propyl]silane is trimethoxy[3-(oxiranylmethoxy)propyl]silane or triethoxy[3-(oxiranylmethoxy)propyl]silane. In another embodiment, the accelerator is sodium chloride, potassium chloride, calcium chloride, magnesium chloride, sodium silicate, potassium silicate, or another accelerator. Other chemical components can be added, based on the environment in which the composition is implemented. For example, to enhance injectivity of water shut-off treatment in water sensitive sandstone formation, a clay control agent can be added to the composition.

Figure 1B:
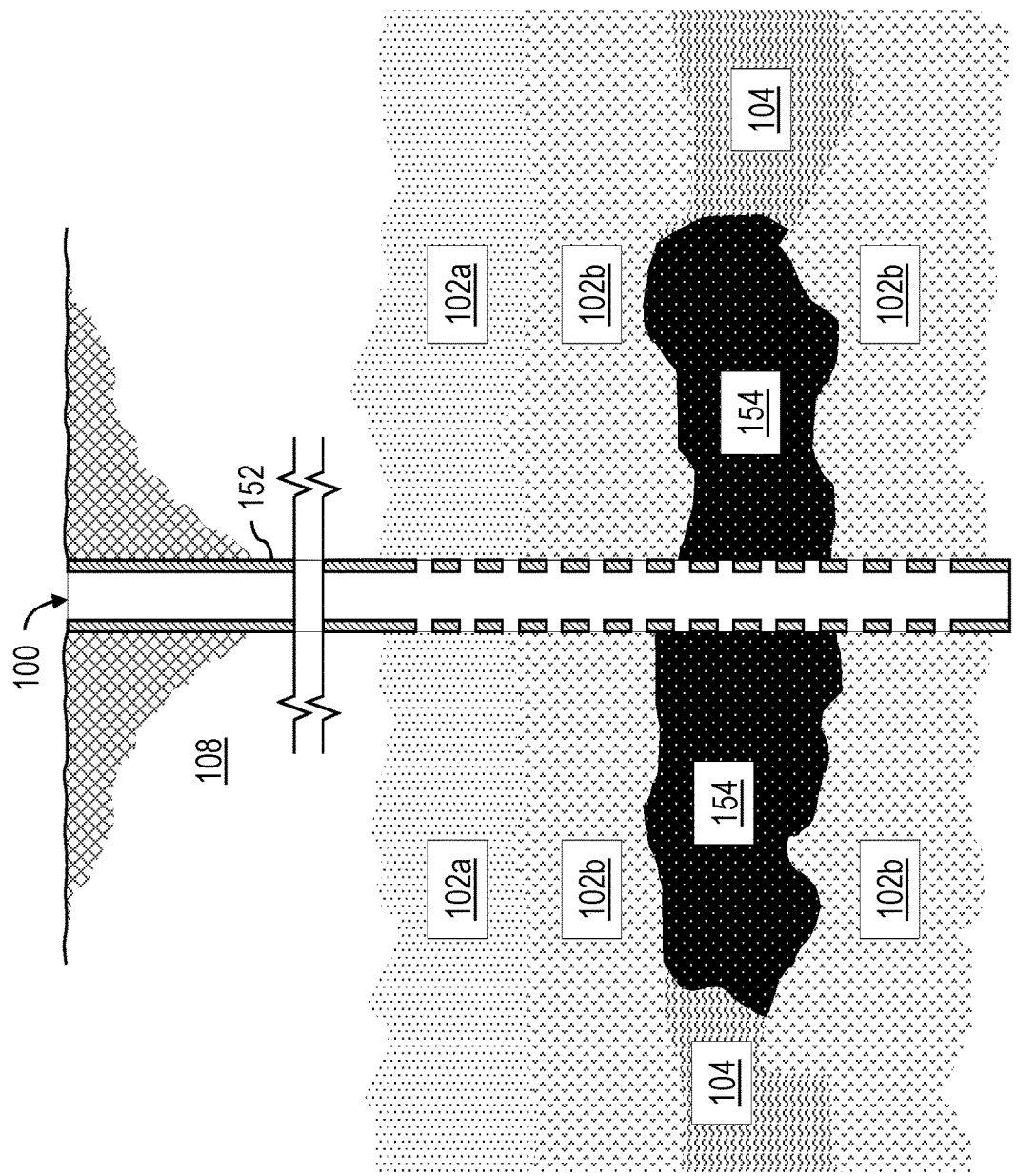

FIG. 1B is a schematic diagram of implementing water control in the wellbore (100). Into the wellbore (100), the composition described here can be flowed, for example, through a tubular shaft or structure (152). The chemistry of the composition results in gelation being delayed until the composition penetrates deeper inside the formation from which the water (104) flows into the wellbore (100). As described earlier, the composition can be flowed into the formation from which the gas (102a) flows into the wellbore (100) to shut-off gas flow. The gel formed by gelation of the composition (for example, gel 154) can cover the invading portions of the formation through which the water (104) flows into the wellbore (100), thereby shutting off water production. In general, the gel (154) formed by the composition can be used to plug the pores in any portion of the formation into which the composition is injected.

Figure 2:
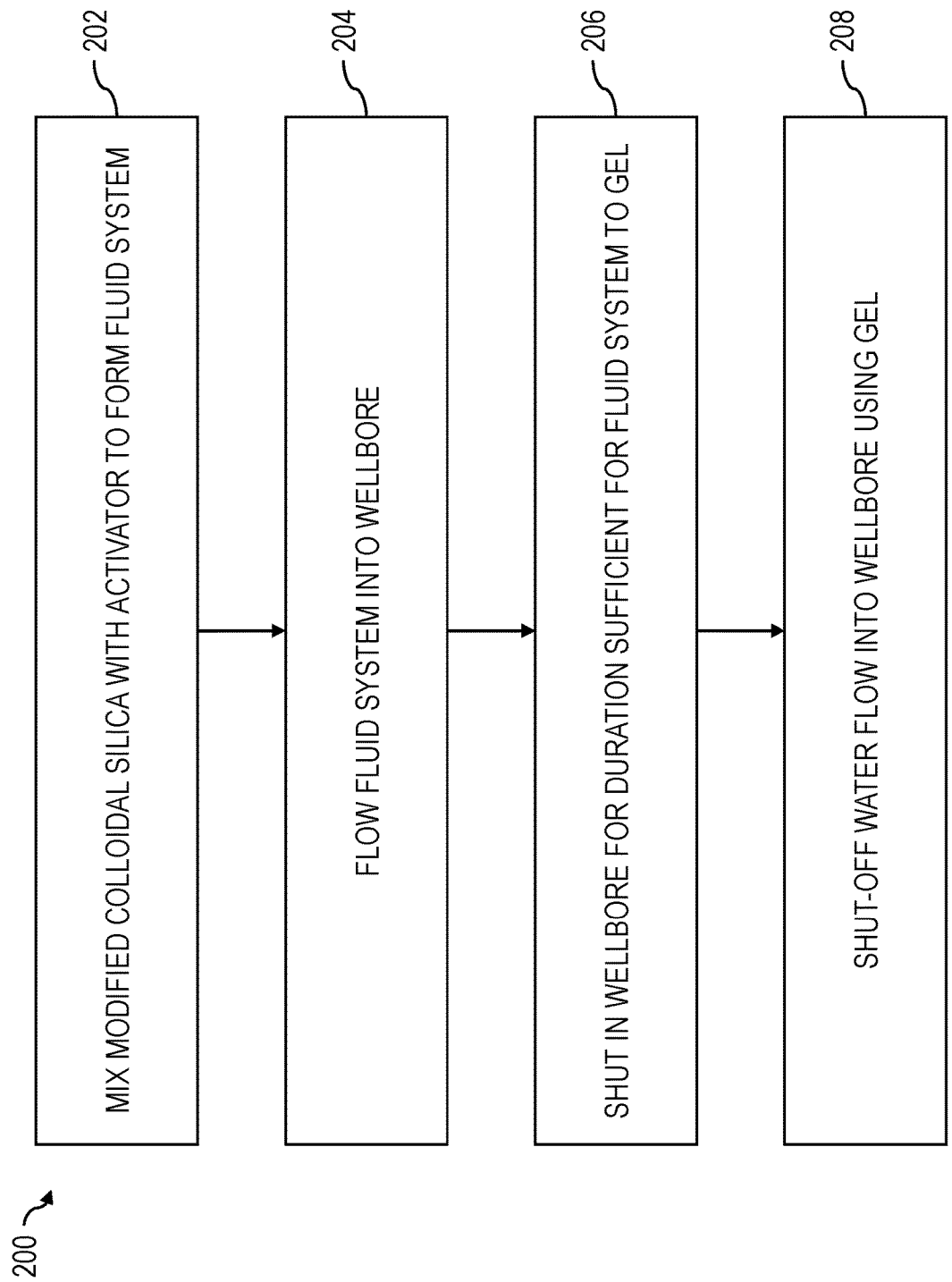
FIG. 2 is a flowchart that outlines an embodiment of a method described in this document.

FIG. 2 is a flowchart of an example of a process (200) for performing a water shut-off operation using the composition described in this document. At (202), modified colloidal silica is mixed with an accelerator to form a composition. In some embodiments, a carrier fluid, for example water or other carrier fluid, is used to flow the composition from the surface to the downhole location. In some embodiments, a quantity of carrier fluid ranges between about 100 gallons per/foot (gal/ft) to about 1000 gal/ft (about 1,242 liters per meter (L/m) to about 12,420 (L/m)). In some embodiments, the ratio of the composition to the carrier fluid ranges between about 0 and about 60% by weight. In some embodiments, the concentration of modified colloidal silica is about 40% in water. In some embodiments, the composition is prepared by mixing 85% for (40%) colloidal silica and 15% accelerator (for example, see the first specimen shown in Table 9). The quantity can be scaled for larger volumes of composition.

At (204), the composition is flowed into a wellbore, for example, the wellbore (100). Prior to or at the time of flowing the composition into the wellbore (100), operations can be implemented to ensure that the composition flows into the formation that needs to be plugged (for example, the water-carrying or gas-carrying formation) and not other formations (for example, the oil-carrying formation). The operations can include proper placement techniques like straddle packer using coil tubing operation of bullheading chemicals without coil tubing. After the composition has been injected into the desired formation, the operations can be reversed, for example, the straddle packer can be removed.

In some embodiments, the rate at which the composition is flowed through the wellbore (100) depends on factors including, for example, a target depth at which water or gas flow is occurring, and injectivity into the formation. For example, a deeper target area with lower injectivity can have a slower flow rate (for example, between 0.5 barrels/minute (bbl/min) and 6 (bbl/min), i.e., between 79.5 liters per minute (L/min) and 954 L/min) compared to a shallow target area with higher injectivity. In some embodiments, the components of the composition are mixed at the surface. In some embodiments, the components of the composition are flowed into the wellbore (100) and mixed while flowing to the target depth. In such embodiments, the flow rate can be modified to allow the components to mix. Because the formation temperature increases with depth, the composition may gel as it flows towards the target depth. In such instances, the flow rate can be periodically increased to overcome the pressure build-up associated with gelation and increase in viscosity.

At (206), the wellbore is shut-in for a duration sufficient for the composition to gel. In some embodiments, the wellbore is shut-in for a duration sufficient for the time that it takes the composition to form the gel that is impermeable to water at the downhole location.

At (208), water flow into the wellbore is shut-off using the gel. Because the gel is impermeable to water, water flow into the wellbore at the downhole location is shut-off. In some embodiments, because the gel plugs the formation, flow through the formation from where the gel is located is shut-off.

EXAMPLES

The following examples demonstrate the gelling properties of various compositions that contained a sol (colloidal silica) and an accelerator. The compositions were prepared by mixing either a colloidal silica or a silanized colloidal silica and an accelerator at room temperature using a magnetic stirrer. Each composition was then transferred to a glass vial for tests at 90° C., or to sealed tubes for tests at 120° C.- 150° C. The compositions were then placed in an oven at the desired temperature, and checked on a regular basis. The gel time was the time at which the composition could be turned upside-down without any flow being evident.

Separate rheological measurements on samples at 150° C. were made using a Grace M5600 Rheometer. A constant shear rate of 10 reciprocal seconds ($s^{-1}$) was applied during the experiment.

Colloidal Silicas 1-13 and Accelerators 1-4 used in the gelling compositions are described below.

Colloidal Silicas

Colloidal Silica 1: A non-functionalized colloidal silica with a surface area of 170 square meters per gram ($m^2g^{-1}$), a particle diameter of 16 nm, containing 40 wt % of silica, having a sodium content (expressed as $Na_2O$) of 0.25 wt %, and having a pH of 9-10.

Colloidal Silica 2: A non-functionalized colloidal silica with a surface area of 130 $m^2g^{-1}$, a particle diameter of 21 nm, containing 40 wt % silica, having a sodium content (expressed as $Na_2O$) of 0.2 wt %, and having a pH of 9-10.

Colloidal Silica 3: An aluminate-modified colloidal silica based on a colloidal silica sol having (before modification) a surface area of 250 $m^2g^{-1}$, and a particle diameter of 11 nm. The aluminate-modified silica sol contained 30 wt % silica and 0.3 wt % $Al_2O_3$, had a sodium content (expressed as $Na_2O$) of less than 0.2 wt %, and had a pH of 6-7.

Colloidal Silica 4: An aluminate-modified colloidal silica, based on a colloidal silica sol having (prior to modification) a surface area of 80 $m^2g^{-1}$ and a particle diameter of 34 nm. The aluminate-modified silica sol contained 41 wt % silica, 0.3 wt % $Al_2O_3$, had a sodium content (expressed as $Na_2O$) of 0.34 wt %, and had a pH of 9-10.

Colloidal Silica 5: An organosilane-modified grade of colloidal silica based on colloidal silica 10 (see below). The modified colloidal silica sol contained 28 wt % silica, had a sodium content (expressed as $Na_2O$) of less than 0.2 wt %, and had a pH of 8. The degree of modification (DM) was 1.4 molecules per $nm^2$ of silica surface, measured by Sears titration. The organosilane compound used to modify the silica was (3-glycidyloxypropyl)triethoxysilane.

Colloidal Silica 6: An organosilane-modified colloidal silica based on colloidal silica 10 (see below). The modified colloidal silica contained 28 wt % silica, had a sodium content (expressed as $Na_2O$) of 0.71 wt %, and had a pH of 10-11. The degree of modification (DM) was 1.05 molecules per $nm^2$ of silica surface, measured by Sears titration. The organosilane compound used to modify the silica was (3-glycidyloxypropyl)triethoxysilane.

Colloidal Silica 7: An organosilane-modified colloidal silica, based on colloidal silica 10 (see below). The modified colloidal silica contained 28 wt % silica, had a sodium content (expressed as $Na_2O$) of 0.5 wt %, and had a pH of 10-11. The degree of modification was 0.7 molecules per $nm^2$ of silica surface, measured by Sears titration. The organosilane compound used to modify the silica was (3-glycidyloxypropyl)triethoxysilane.

Colloidal Silica 8: An organosilane-modified colloidal silica based on a colloidal silica having (before modification) a surface area of 220 $m^2g^{-1}$ and particle diameter of 12 nm. The modified silica sol contained 38 wt % silica, had a sodium content (expressed as $Na_2O$) of less than 0.2 wt %, and had a pH of 8. The degree of modification was 1.7 molecules per $nm^2$ of silica surface, measured by Sears titration. The organosilane compound used to modify the silica was (3-glycidyloxypropyl)triethoxysilane.

Colloidal Silica 9: An organosilane-modified colloidal silica, based on a colloidal silica having (before modification) a surface area of 220 $m^2g^{-1}$ and a particle diameter of 12 nm. The modified colloidal silica contained 38 wt % silica, had a sodium content (expressed as $Na_2O$) of 0.51 wt %, and had a pH of 10-11. The degree of modification was 1.7 molecules per $nm^2$ of silica surface, measured by Sears titration. The organosilane compound used to modify the silica was (3-glycidyloxypropyl)triethoxysilane.

Colloidal Silica 10: A non-functionalized colloidal silica with a surface area of 360 $m^2g^{-1}$, a particle size of 7 nm, containing 30 wt % silica, having a sodium content (expressed as $Na_2O$) of 0.6 wt %, and having a pH of 10-11.

Colloidal Silica 11: An organosilane-modified colloidal silica based on colloidal silica 10 (see above). The modified colloidal silica contained 30 wt % silica, had a sodium content (expressed as $Na_2O$) of 0.7 wt %, and had a pH of 10-11. The degree of modification (DM) was 1.4 molecules per $nm^2$ of silica surface, measured by Sears titration. The organosilane compound used to modify the silica was (3-glycidyloxypropyl)triethoxysilane (60 mol %) and propyltriethoxysilane (40 mol %).

Colloidal Silica 12: An organosilane-modified colloidal silica based on colloidal silica 1 (see above). The modified colloidal silica contained 40 wt % silica, had a sodium content (expressed as $Na_2O$) of 0.3 wt %, and had a pH of 10-11. The degree of modification (DM) was 1.7 molecules per $nm^2$ of silica surface, measured by Sears titration. The organosilane compound used to modify the silica was methyltriethoxysilane.

Colloidal Silica 13: An organosilane-modified colloidal silica based on colloidal silica 10 (see above). The modified colloidal silica contained 30 wt % silica, had a sodium content (expressed as $Na_2O$) of 0.7 wt %, and had a pH of 10-11. The degree of modification (DM) was 1.4 molecules per $nm^2$ of silica surface, measured by Sears titration. The organosilane compound used to modify the silica was (3-glycidyloxypropyl)triethoxysilane (50 mol %) and ureidopropyltriethoxysilane (50 mol %).

Accelerators

Accelerator 1: Sodium silicate, provided in aqueous form having an $SiO_2$ concentration of 24.2 wt % and sodium content (expressed as $Na_2O$) of 7.3 wt %.

Accelerator 2: Potassium silicate, provided in aqueous form having an $SiO_2$ concentration of 23.8 wt % and a potassium content (expressed as $K_2O$) of 11 wt %.

Accelerator 3: Sodium chloride, provided either as a 10 wt % or a 25 wt % aqueous solution.

Accelerator 4: Sodium hydroxide, provided as a 10.3 wt % aqueous solution.

Example 1

In the Examples below, X=Si/cation mole ratio. In the calculations of X, colloidal silica or organosilane-functionalized colloidal silica sources having less than 0.2 wt % alkali metal were treated as if they had no alkali metal.

Table 1 shows the results of gelling experiments of Colloidal Silicas 1 to 4 that used different amounts of potassium silicate accelerator (Accelerator 2) at 90° C. The temperature was typically lower than experienced in a subterranean oil or gas well.

TABLE 1

Gel times of non-organosilanized colloidal silica at 90° C.

| Colloidal silica | Colloidal silica mass (g) | Accelerator 2 mass (g)[1] | $SiO_2$[2] (g)/ $K_2O$[3] (g) | Si/cation mole ratio | Gel time (hours) |
|---|---|---|---|---|---|
| 1 | 200 | 24 | 85.71/2.64 | 19.80 | 2 |
| 1 | 200 | 22 | 85.24/2.42 | 21.06 | 3 |
| 1 | 200 | 20 | 84.76/2.20 | 22.51 | 4-5 |
| 1 | 200 | 18 | 84.28/1.98 | 24.20 | 8-12 |
| 1 | 200 | 16 | 83.81/1.76 | 26.18 | 24-48 |
| 1 | 200 | 14 | 83.33/1.54 | 28.54 | No gel[4] |
| 2 | 200 | 24 | 85.71/2.64 | 21.22 | 4 |
| 2 | 200 | 22 | 85.24/2.42 | 22.64 | 5-6 |
| 3 | 200 | 24 | 65.71/2.64 | 19.54 | 7-8 |
| 4 | 200 | 24 | 87.71/2.64 | 18.38 | 12-16 |

[1]Based on weight of aqueous potassium silicate
[2]Total weight of silica from colloidal silica and the accelerator
[3]Potassium content of the aqueous potassium silicate expressed as wt % $K_2O$
[4]No gel after several days These experiments showed that the amount of accelerator affected gel times, as did the source of silica. The alumina-modified colloidal silicas (Colloidal Silicas 3 and 4) showed the slowest gel times of those used.

Example 2

Table 2 shows the gel times for two non-organosilanized colloidal silicas (Colloidal Silicas 1 and 4) under higher temperature conditions, at 120° C. in the presence of Accelerator 2.

These results showed the high sensitivity to the gel times with only small changes in the amounts of potassium silicate accelerator used.

TABLE 2

Gel times of non-organosilanized colloidal silica at 120° C.

| Colloidal silica | Colloidal silica mass (g) | Accelerator 2 mass (g)[1] | $SiO_2$[2] (g)/ $K_2O$[3] (g) | Si/cation mole ratio | Gel time (hours) |
|---|---|---|---|---|---|
| 1 | 20 | 1.5 | 8.357/0.165 | 27.30 | 0.5 |
| 1 | 20 | 1.25 | 8.298/0.138 | 30.63 | 10-20 |
| 1 | 20 | 1 | 8.238/0.110 | 34.95 | No gel[4] |
| 4 | 100 | 11 | 43.62/1.21 | 19.46 | 0.7-1.0 |
| 4 | 100 | 10 | 43.38/1.10 | 20.68 | 1.5-2.0 |
| 4 | 100 | 9 | 43.14/0.99 | 22.08 | No gel[5] |

[1]Based on weight of aqueous potassium silicate
[2]Total weight of silica from colloidal silica and the accelerator
[3]Potassium content of the aqueous potassium silicate expressed as wt % $K_2O$
[4]No gel after seven days
[5]No gel after 24 hours Example 3

Example 2 was repeated, except colloidal silicas with different extents of organosilanization (Colloidal Silicas 5-7 and 10-13) and a different accelerator (Accelerator 3) that contained sodium chloride were used. Results are shown in Table 3.

This experiment showed that gel times were affected by the extent of organosilane modification of the colloidal silica. Low organosilane coverage still caused rapid gelling to take place. Increasing the extent of silanization allowed longer gel times to be achieved. The results also showed that varying the amount of accelerator contributed to achieving control over gelling times, and this was less sensitive than the use of unmodified colloidal silica.

These results also indicated that a halide salt such as sodium chloride could be used as accelerator. In addition, the results showed greater control over gelling rates could be achieved using silanized silica.

The experiments further indicated that modification with hydrophilic groups tended to give slower gelling rates as compared to modification with hydrophobic groups.

TABLE 3

Gel times of organosilanized colloidal silicas at 120° C.

| Colloidal silica | Colloidal silica mass (g)[5] | Accelerator 3 mass (g)[5] | $SiO_2$/ cation mole ratio | Gel time (hours) |
|---|---|---|---|---|
| 5 | 20.0 | 8.33 | 2.34 | 2[1] |
| 6 | 20.0 | 8.33 | 2.12 | 10-30 min |
| 6 | 24.0 | 5.00 | 3.87 | 0.5-1.0 |
| 6 | 27.3 | 2.27 | 7.70 | 1.0-1.5 |
| 6 | 28.6 | 1.19 | 11.47 | 5 |
| 6 | 27.3 | 0.91 | 12.70 | 12-24[2] |
| 6 | 28.6 | 0.48 | 16.20 | 24-48[2] |
| 7 | 24.0 | 2.5 | 7.06 | n/a[3] |
| 7 | 27.3 | 0.8 | 14.62 | n/a[4] |
| 10 | 20 | 8.33 | 2.14 | Rapid[3] |
| 10 | 24 | 5.00 | 3.97 | Rapid[3] |
| 10 | 27.3 | 2.27 | 8.12 | <10 min[4] |
| 10 | 28.6 | 1.19 | 12.42 | <15 min[4] |
| 10 | 27.3 | 0.91 | 13.89 | <15 min[2] |
| 10 | 28.6 | 0.48 | 18.20 | 15-25 min[2] |
| 11 | 27.3 | 0.91 | 12.6 | 30-45 min |
| 12 | 36.4 | 0.91 | 24.87 | 30-45 min |
| 13 | 24 | 5.00 | 3.86 | 1.5-2 h |
| 13 | 28.6 | 1.19 | 11.47 | 3.5-4 h |

[1]Soft gel
[2]10 wt % NaCl solution used
[3]Gelled at room temperature after only 20 minutes
[4]Gelled fast when heated
[5]Weight of silica or sodium chloride, not including water Example 4

Table 4 shows the gelling results at 120° C. for a different organosilanized colloidal silica (colloidal silica 8) in the presence of sodium silicate (Accelerator 1). These results showed that gel times at 120° C. can be controlled over a wide range when using relatively high concentrations of the sodium silicate accelerator.

TABLE 4

Gel times of an organosilanized colloidal silica at 120° C.

| Colloidal silica | Colloidal silica mass (g) | Accelerator 1 mass (g)[1] | $SiO_2$[2] (g)/ $Na_2O$[3] (g) | $SiO_2$/cation mole ratio | Gel time (hours) |
|---|---|---|---|---|---|
| 8 | 22.8 | 7.2 | 10.41/0.526 | 10.23 | 2.5 |
| 8 | 23.4 | 6.6 | 10.49/0.482 | 11.25 | 6.5 |
| 8 | 24.0 | 6.0 | 10.57/0.438 | 12.47 | 11 |

[1]Based on weight of aqueous sodium silicate
[2]Total weight of silica from colloidal silica and the accelerator
[3]Sodium content of the aqueous sodium silicate expressed as wt % $Na_2O$

Example 5

The gelling times of organosilanized colloidal silicas with different particle sizes were evaluated at 150° C. in the presence of two different silicate accelerators, Accelerator 1 and Accelerator 2. Results are shown in Table 5.

These results demonstrated that gelling times can be controlled by using different silicate accelerators and organosilanized colloidal silicas with different particle sizes. The organosilane-functionalized colloidal silica with larger particle size (Colloidal Silica 8) had a higher degree of modification, and tended to require more accelerator to achieve gelling.

TABLE 5

Gel times of organosilanized colloidal silicas at 150° C.

| Colloidal silica/ Accelerator | Colloidal silica mass (g) | Accelerator mass (g)[1] | $SiO_2$[2] (g)/ $M_2O$[3] (g)[4] | $SiO_2$/ cation mole ratio | Gel time (hours) |
|---|---|---|---|---|---|
| 8/1 | 24.6 | 5.4 | 10.65/0.394 | 13.96 | <1 |
| 8/1 | 24.9 | 5.1 | 10.67/0.372 | 14.84 | 2 |
| 8/1 | 25.2 | 4.8 | 10.74/0.350 | 15.83 | 3.5 |
| 8/1 | 25.5 | 4.5 | 10.78/0.329 | 16.95 | 9-12.5 |
| 8/1 | 25.8 | 4.2 | 10.82/0.301 | 18.23 | 20-25 |
| 8/2 | 25.2 | 4.8 | 10.72/0.528 | 15.94 | 1-2 |
| 8/2 | 25.5 | 4.5 | 10.76/0.495 | 17.07 | 3.0-3.5 |
| 8/2 | 25.8 | 4.2 | 10.80/0.462 | 18.36 | 12-20 |
| 6/2 | 28.2 | 1.8 | 8.332/0.131 | 13.88 | 4 |
| 6/2 | 28.5 | 1.5 | 8.343/0.110 | 14.83 | 7 |
| 6/2 | 28.8 | 1.2 | 8.354/0.088 | 15.93 | 12-14 |

[1]Based on weight of aqueous sodium or potassium silicate
[2]Total weight of silica from colloidal silica and the accelerator
[3]M is Na (Accelerator 1) or K (Accelerator 2)
[4]Alkali metal content of the aqueous alkali metal silicate expressed as wt % $M_2O$

Example 6

Figure 3:
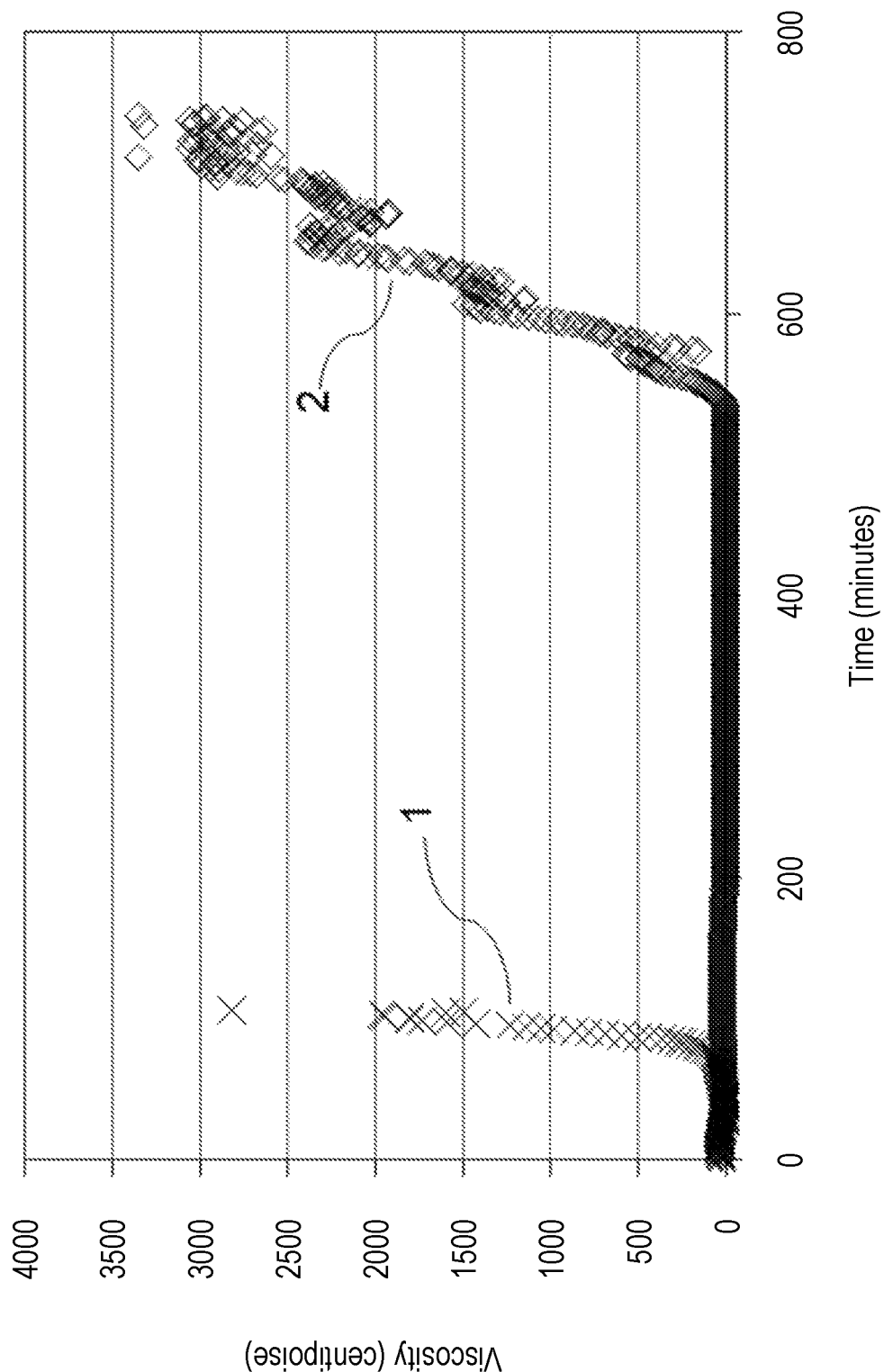
FIG. 3 is a plot showing the change in viscosity over time for two gelling systems using an organosilane-modified colloidal silica and different quantities of a sodium silicate accelerator.

Rheological studies at 150° C. were conducted on two different compositions based on Colloidal Silica 8, with either 15 or 17 wt % sodium silicate (Accelerator 1) as the accelerator. A constant shear rate of 10 $s^{-1}$ was applied during the experiment. Measurements were taken using a Grace M5600 Rheometer. The time-dependent viscosity measurements were taken during gelling of the two compositions, and the results are illustrated in FIG. 3. In FIG. 3, reference numeral 1 indicates the results for the composition comprising 17 wt % Accelerator 1 (with data points marked as crosses), while reference numeral 2 indicates the results for the composition comprising 15 wt % Accelerator 1 (with data points marked as diamonds).

For each composition, there was a time lag before gelling commenced, at which point there was a rapid increase in viscosity. This is a desirable profile for down-well applications, as the composition can be selected to gel at the correct time, based on the depth of the porous subterranean formation. Because of the steep profile, the composition remains relatively mobile before this point, causing less chance of premature gelling and potential problems during pumping of the composition down the well.

The results also showed that by varying the amount of accelerator, the onset of the fast gelling could be controlled.

Example 7

Table 6 shows the results of compositions that included Accelerator 1 and Colloidal Silica 9, which is similar to Colloidal Silica 8, but which had a higher level of alkali metal, and a higher pH. Gelling was evaluated at 150° C.

TABLE 6

Effects of cation content on gelling times of an organosilanized colloidal silica at 150° C.

| Colloidal silica | Colloidal silica mass (g) | Accelerator 1 mass (g)[1] | $SiO_2$ (g)[2]/ $Na_2O$ (g)[3] | $SiO_2$/Na mole ratio | Gel time (hours) |
|---|---|---|---|---|---|
| 9 | 26.1 | 3.9 | 11.25/0.42 | 13.91 | 2.5 |
| 9 | 26.4 | 3.6 | 11.29/0.40 | 14.69 | 4 |
| 9 | 26.7 | 3.3 | 11.34/0.38 | 15.54 | 6 |
| 9 | 27.0 | 3.0 | 11.39/0.36 | 16.49 | 12-14 |
| 9 | 27.3 | 2.7 | 11.44/0.34 | 17.56 | 30-40 |

[1]Based on weight of aqueous sodium or potassium silicate
[2]Total weight of silica from colloidal silica and the accelerator
[3]Sodium content of the aqueous sodium silicate expressed as wt % $Na_2O$ The results showed that the compositions functioned effectively, even when the initial pH of the silica sol was different, for example, when compared with the results shown in Tables 4 and 5.

Example 8

These experiments were based on compositions that contained either Colloidal Silica 8 or 9 and sodium hydroxide as the accelerator (Accelerator 4) at 150° C. Results are shown in Table 7 below.

TABLE 7

Effects of a hydroxide as accelerator at 150° C.

| Colloidal silica | Colloidal silica mass (g) | Accelerator 4 mass (g)[1] | $SiO_2$ (g)[2]/ $Na_2O$ (g)[3] | $SiO_2$/cation mole ratio | Gel time (hours) |
|---|---|---|---|---|---|
| 8 | 84 | 16 | 31.92/1.65 | 12.91 | 3 |
| 9 | 88 | 12 | 33.44/1.24 | 12.77 | 2 |
| 9 | 89 | 11 | 33.82/0.32 | 13.64 | 4.5 |

[1]Based on weight of aqueous sodium or potassium silicate
[2]Total weight of silica from colloidal silica and the accelerator
[3]Sodium content of the aqueous sodium silicate expressed as wt % $Na_2O$ These results showed that a hydroxide, such as sodium hydroxide, could also function as an effective accelerator, even at the higher temperature of 150° C.

Example 9—Static Gelation Test

Static gelation tests were performed in a glass test tube and gelation was estimated by visual observation. In a typical static gelation test, a glass test tube was filled with a mixture of modified colloidal silica and a sodium silicate solution up to about half of the total available volume within the glass test tube. The glass tube was then either left at room temperature or placed in a preheated oven set at a testing temperature (for example, 200° F. or 300° F.). If placed in a preheated oven, the tubes were taken out periodically for observation. The gelation time was estimated to be the time taken for the mixture to reach a point where the formed gel did not move when the glass tube was turned upside down (which could be interpreted as the gel having lost flowability). Table 8 shows the gelation times observed for an organosilane-modified colloidal silica and a standard (unmodified) colloidal silica. The modified colloidal silica was Colloidal Silica 8 described above. A sodium silicate solution was used as the accelerator in these systems. A typical sodium silicate solution used in the static gelation test had the following characteristics: potential of hydrogen (pH) of 11.27, specific gravity of 1.359, 26.1 wt % of silicon dioxide ($SiO_2$), 8.40 wt % of sodium oxide ($Na_2O$), molar ratio of silicon dioxide to sodium oxide ($SiO_2/Na_2O$) of 3.21, and 36 ppm of iron (Fe).

TABLE 8

Gelation time at different temperatures

| Colloidal silica (wt %) | Sodium silicate (wt %) | Temperature (° F./° C.) | Gelation time (hrs) |
|---|---|---|---|
| 90[1] | 10 | 200/93 | ~6 |
| 90[1] | 10 | 300/148 | Immediate |
| 84[2] | 16 | 300/148 | ~4 |

[1]Unmodified colloidal silica
[2]Organosilane-modified colloidal silica

As shown in Table 8, the gelation time at 300° F. (148° C.) was approximately 4 hours for the organosilane-functionalized colloidal silica composition as compared to the composition that contained the non-functionalized colloidal silica, which gelled almost immediately. The gelation time at 200° F. (93° C.) for the unmodified colloidal silica was approximately 6 hours.

Example 10—Viscosity Test

The viscosity test was another technique used to obtain information about gelation times and the gelation behavior of colloidal silica-based fluids under high pressure and high temperature (HPHT) conditions. The compositions were prepared by mixing either 85 wt % or 87 wt % of Colloidal Silica 8 described above with liquid sodium silicate with stirring. A typical sodium silicate solution used in the viscosity test was the same as the sodium silicate used in the static gelation test. The mixing was done at room temperature and the composition was then heated in a pressurized rheometer sample cup to a set temperature at a shear rate of 10 s$^{-1}$. The map rheometer tests with colloidal silica-based fluids were conducted at set temperatures of 273° F. (134° C.), 300° F. (148° C.) and 312° F. (156° C.). The temperatures were similar to downhole temperatures in wellbores such as gas wells. The viscosity was measured during the viscosity tests using a viscometer/rheometer, and viscosity was monitored as a function of time. The gelation time was estimated to be the time taken for the viscosity of the mixture to increase significantly, for example, an increase in viscosity of at least 10%, at least 15%, at least 20%, at least 25%, at least 30%, at least 40%, at least 50%, or over 50% in comparison to the viscosity of the mixture at the beginning of the test. For a plot showing viscosity measurements vs. time of a mixture of colloidal silica and sodium silicate, the gelation time could be estimated as the time taken to reach the inflection point of the viscosity-time curve. The gelation times for the different formulations used at these temperatures are shown in Table 9.

TABLE 9

Gelation time at various test temperatures

| Colloidal silica (wt %) | Sodium silicate (wt %) | Temperature (° F./° C.) | Gelation time (min) |
|---|---|---|---|
| 85 | 15 | 273/134 | 154 |
| 87 | 13 | 300/148 | 275 |
| 87 | 13 | 312/156 | 157 |

As Table 9 reveals, the gelation time varied with temperature and concentrations of the modified colloidal silica and sodium silicate accelerator.

Example 11—Core Flooding Test

The injectivity and long-term stability of the gel systems inside pores was analyzed. Core flooding tests using sandstone core plugs with 24% porosity and 400 milli-Darcy (mD) brine permeability and the composition containing Colloidal Silica 8 were performed. An initial steady state was achieved by pumping approximately 50 pore volumes as pre-flush before the chemical treatment using the composition. The initial pressure drop was around 1 psi (0.07 bar) at a constant flow rate of 1 cm$^3$/min. This was followed by the main stage of water shut off treatment.

Figure 4A:
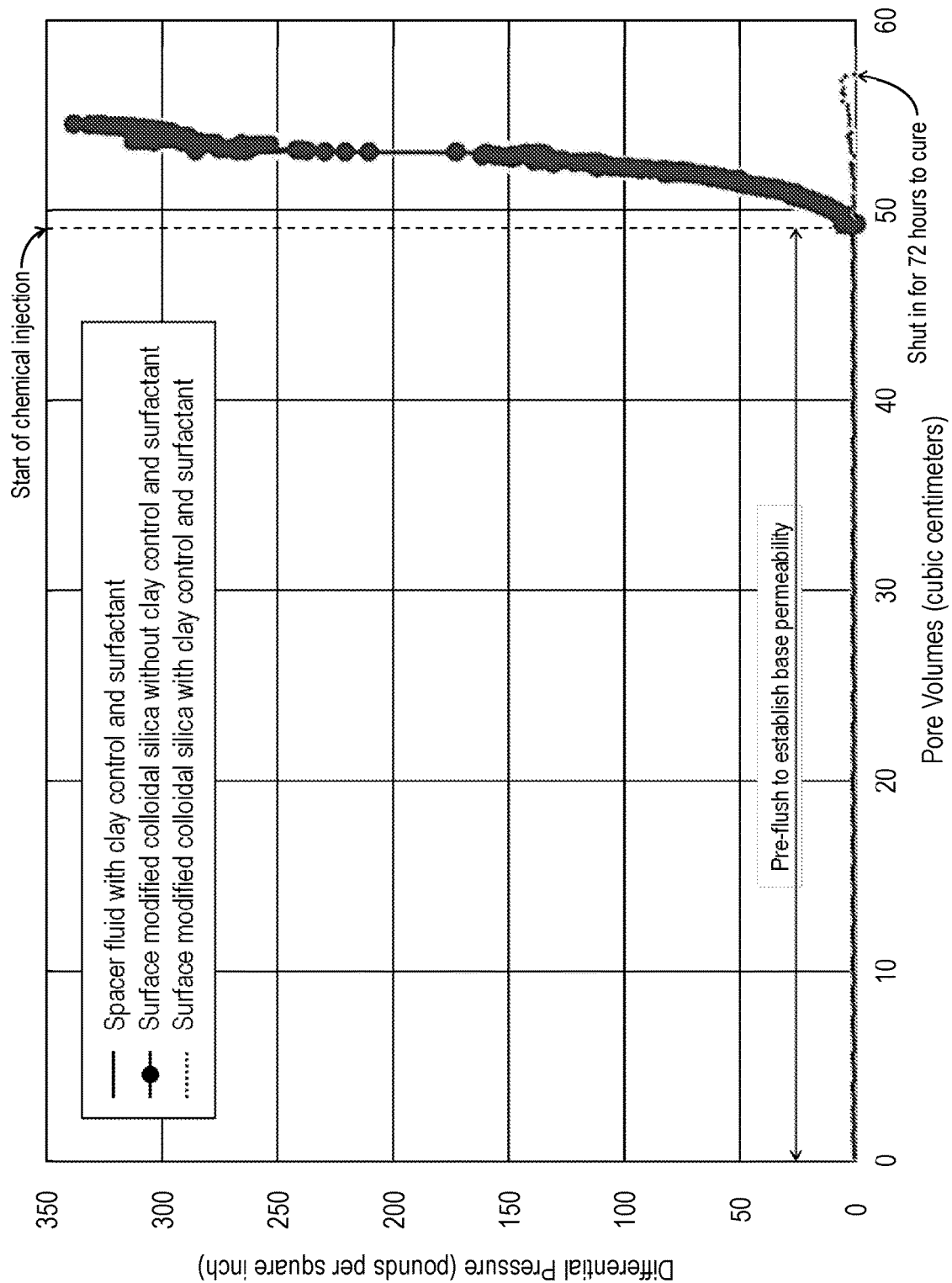
FIGS. 4A and 4B are plots showing results of core flooding tests performed using a modified colloidal silica composition.

To measure the injectivity of the composition before a field application, two core flow tests were conducted. In the first core test, clay stabilizer (a chloride salt) was not used with the composition. FIG. 4A shows the pressure drop and number of pore volumes during the injection of pre-flush and water shut-off treatment. During the chemical injection, a significant pressure increase of 340 psi (23.4 bar) was observed after injecting 5 pore volumes. The increase can be attributed to clay swelling.

In the second core test, clay stabilizer and surfactant (a mixture of alcohols and quaternary ammonium compounds) were added to prevent clay swelling and to improve injectivity of the composition. The results of the second core test showed a significant improvement of injectivity during the chemical treatment when the clay stabilizer and the surfactant were added to the main stage of the treatment. A total of 7 pore volumes were injected with little increase in injection pressure (7 psi/0.5 bar) as compared with the first core test. After the main stage was injected, flow was shut-in for curing.

Example 12—Endurance Test (Long Constant Pressure Experiment)

Figure 4B:
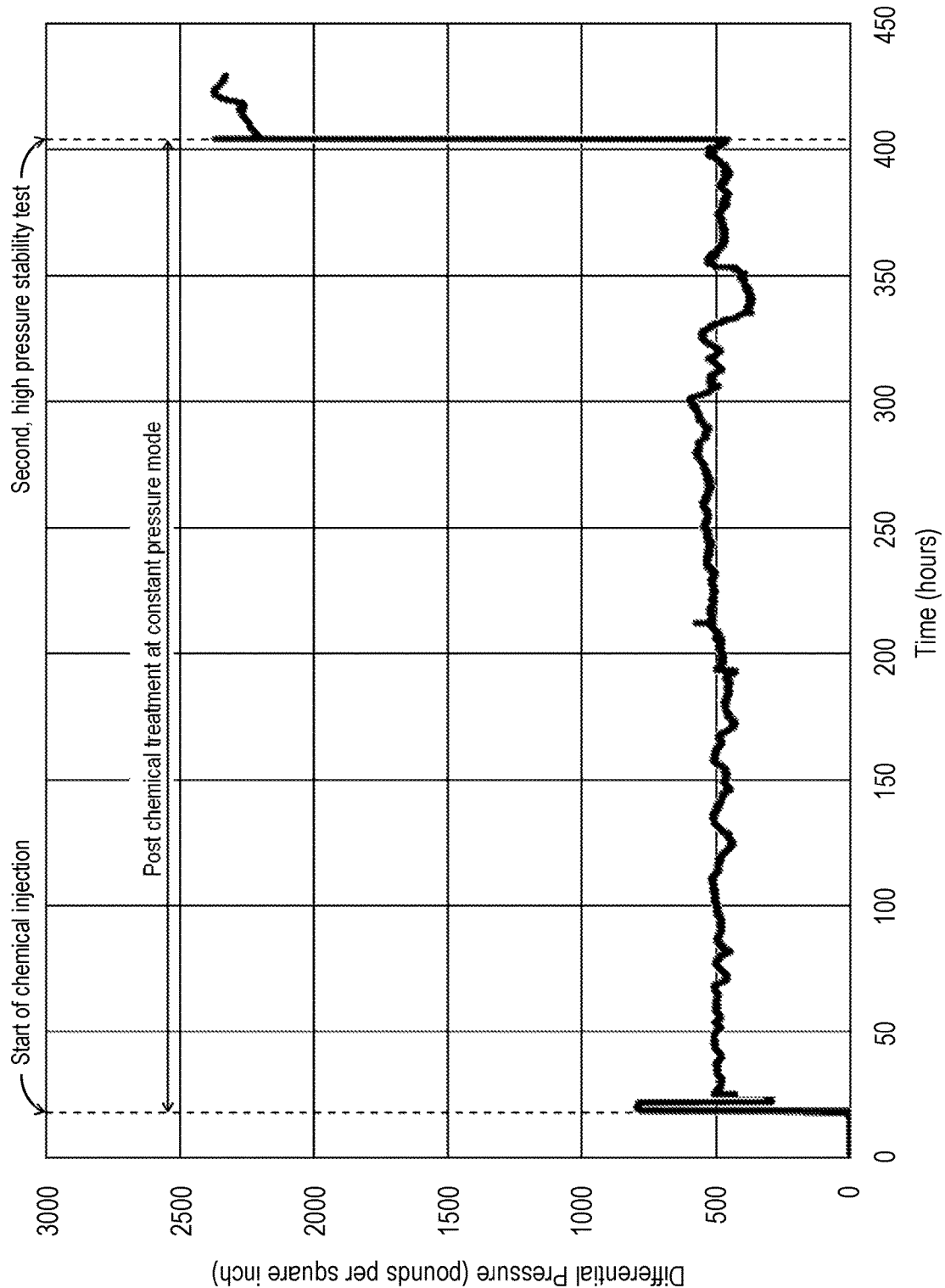

After a curing time of 72 hours, the formation brine was injected in a post-injection process to determine the plugging efficiency of the chemical treatment by measuring differential pressure across core as shown in FIG. 4B. In a typical long constant pressure experiment, a formation brine was injected through a core plug using a pump at a constant flow rate of 1 milliliter per minute (mL/min), and differential pressure across the core plug was measured throughout the injection process. Once the pressure on the core plug reached a desired pressure, the pump was set at constant pressure mode, and differential pressure and flow rate was measured. The pump was kept operating for several days to determine plugging efficiency. No pressure decrease and no effluent indicated that the porous media (the core plug after chemical treatment) was fully plugged. The formation brine had the following composition: 50,500 milligrams per liter (mg/L) of sodium ion, 24,300 mg/L of calcium ion, 891 mg/L of magnesium ion, 732 mg/L of sulfate ion, 123,000 mg/L of chloride ion, and 22 mg/L of bicarbonate ion. Following post-injection, an endurance test was started and the differential pressure was held at 800 psi (55.2 bar) for 3.5 hours, and then held at 300 psi (20.7 bar) for 3 hours. Then, the differential pressure was held at about 500 psid (34.5 bar-d) for about 380 hours with minimal leak-off through the treated core plug. The average measured leak-off rate during this period was 0.0018 cm$^3$/min. After 15 days at 300° F. (148° C.), a second, high pressure stability test was conducted to assess the holding pressure of the chemical plug. For the second, high pressure stability test, the pump used to supply pressure was switched from constant pressure mode to constant flow mode, and the pressure applied on the core plug reached 2400 psi (166 bar). The pump was switched back to constant pressure mode, and the pressure drop averaged around 2300 psid (159 bar-d) with no evidence of flow through the plug sample.

Thus, particular embodiments of the subject matter have been described. Other implementations are within the scope of the claims.

The invention claimed is:

1. A gelled composition, comprising:
    a modified colloidal silica, wherein at least a portion of surface silanol groups of an unmodified colloidal silica are replaced with an organosilane moiety; and
    an accelerator that is an organic or inorganic salt comprising one or more cations,
    wherein a silica to cation molar ratio (X) of the gelled composition is defined by the equation:

$$X = \frac{N_{silica}}{N_{cations} \times Z^6}$$

wherein X is between about 8 and about 50, $N_{silica}$ is a total number of moles of silica in the gelled composition, $N_{cations}$ is a total number of moles of cations in the gelled composition, and Z is a charge on the cation; and
    wherein the gelled composition is present in a subterranean zone.

2. The composition of claim 1, wherein the organosilane moiety comprises a silicon atom bound to one, two, or three $R^1$ groups by a direct Si—C bond, and wherein:
    each $R^1$ is independently selected from the group consisting of i) alkyl, ii) epoxy alkyl, iii) alkenyl, iv) aryl, v) heteroaryl, vi) $C_{1-6}$ alkylaryl, and vii) $C_{1-6}$ alkylheteroaryl, any of which are optionally substituted with one or more groups selected from among $ER^2$, isocyanate, and isocyanurate;
    E is absent or is a linking group selected from the group consisting of —O—, —S—, —OC(O)—, —C(O)—, —C(O)O—, —C(O)OC(O)—, —N($R^3$)—, —N($R^3$)C(O)—, —N($R^3$)C(O)N($R^3$)—, and —C(O)N($R^3$)—;
    $R^2$ is selected from the group consisting of hydrogen, F, Cl, Br, alkyl, alkenyl, aryl, heteroaryl, $C_{1-3}$ alkylaryl, and $C_{1-3}$ alkylheteroaryl, and is optionally substituted with one or more groups selected from the group consisting of hydroxyl, F, Cl, Br, epoxy, —$OR^3$, and —N($R^3$)$_2$; and
    $R^3$ is H or $C_{1-6}$ alkyl.

3. The composition of claim 2, wherein $R^1$ is a hydrophilic moiety or becomes hydrophilic after hydrolysis.

4. The composition of claim 3, wherein $R^1$ comprises a member selected from the group consisting of carboxyl, ester, epoxy, acyloxy, ketone, aldehyde, (meth)acryloxy, amido, hydroxyl, thiol, amino, ureido, isocyanate, and isocyanurate.

5. The composition of claim 2, wherein $R^1$ comprises an epoxy group or one or more hydroxyl groups.

6. The composition of claim 5, wherein $R^1$ comprises an $ER^2$ substituent, wherein E is —O— and $R^2$ is selected from the group consisting of $C_{1-8}$-epoxyalkyl, substituted-$C_{1-8}$-epoxyalkyl, and a hydroxyl-substituted alkyl.

7. The composition of claim 2, wherein $R^1$ is a hydrophilic group comprising at least one heteroatom selected from O and N, and comprising no more than three consecutive alkylene ($CH_2$) groups.

8. The composition of claim 7, wherein $R^1$ is selected from the group consisting of 3-glycidoxypropyl, 2,3-dihydroxypropoxypropyl, 2,3-dihydroxypropyl, and 2,3-dihydroxypropoxypropyl.

9. The composition of claim 2, wherein the modified colloidal silica is prepared by contacting the unmodified colloidal silica with an organosilane reactant, wherein the organosilane reactant is selected from the group consisting of a compound having the formula $T_{4-y}Si—[R^1]_y$, a siloxane having the formula $[R^1]_b T_{3-b}Si\{—O—SiT_{2-c}[R^1]_c\}_a—O—SiT_{3-b}[R^1]_b$, and a disilazane having the formula $\{[R^1]_b T_{3-b} Si\}_2$—NH, wherein:
    y is from 1 to 3;
    each a is independently from 0 to 5;
    each b is independently from 1 to 3;
    c is 1 or 2; and
    each T is independently selected from the group consisting of halide, hydroxyl, $C_{1-6}$ alkoxy, and $C_{1-6}$ haloalkoxy.

10. The composition of claim 1, wherein a degree of surface modification (DM) of the organosilane-modified colloidal silica is defined by the equation:

$$DM = \frac{AN_{organosilane}}{(S_{silica} \times M_{silica} \times 10^{18})}$$

wherein DM is between about 0.8 and about 4 molecules per $nm^2$, A is Avogadro's constant, $N_{organosilane}$ is a number of moles of organosilane reactant used, $S_{silica}$ is a surface area of the silica in the colloidal silica, in $m^2$ $g^{-1}$, and $M_{silica}$ is a mass of silica in the colloidal silica, in g.

11. The composition of claim 10, wherein DM is between about 1 to about 4.

12. The composition of claim 10, wherein DM is between about 1 to about 2.

13. The composition of claim 1, wherein X is within a range selected from the group consisting of between about 8 to about 25, between about 8 to about 20, between about 10 to about 50, between about 10 to about 25, and between about 10 to about 20.

14. The composition of claim 1, wherein the accelerator comprises one or more members selected from the group consisting of halides, silicates, sulfates, nitrates, carbonates, carboxylates, oxalates, sulfides, and hydroxides.

15. The composition of claim 14, wherein the accelerator comprises at least one hydroxide and at least one silicate.

16. The composition of claim 1, wherein a cation of the one or more cations of the accelerator is selected from the group consisting of alkali metal ions, alkaline earth metal ions, hydrogen ions, ammonium ions, primary organoammonium ions, secondary organoammonium ions, tertiary organoammonium ions, and quaternary organoammonium ions.

17. The composition of claim 1, wherein a cation of the one or more cations of the accelerator is monovalent.

18. The composition of claim 17, wherein the monovalent cation is an alkali metal cation.

19. The composition of claim 18, wherein the monovalent cation is a sodium cation.

20. The composition of claim 18, wherein the monovalent cation is a potassium cation.

21. The composition of claim 1, wherein the accelerator is selected from the group consisting of sodium silicate, potassium silicate, sodium chloride, and sodium hydroxide.

22. The composition of claim 1, wherein a pH of the composition is between about 6 and about 11.

23. The composition of claim 22, wherein the pH is between about 9 and about 11.

24. The composition of claim 1, wherein the accelerator is present in an amount of between about 1 and about 30 wt % of the composition.

25. The composition of claim 1, wherein a silica content of the composition is between about 3 and about 55 wt % of the unmodified silica.

26. The composition of claim 1, wherein the accelerator is present in an amount of between about 1 and about 30 wt % of the composition and a silica content of the composition is between about 3 and about 55 wt % of the unmodified silica.

27. The composition of claim 1, wherein the accelerator causes or facilitates a reaction between the modified colloidal silica particles in the composition to form the gelled composition.

28. A composition, comprising:
a modified colloidal silica, wherein at least a portion of surface silanol groups of an unmodified colloidal silica are replaced with an organosilane moiety; and
an accelerator that is an organic or inorganic salt comprising one or more cations;
wherein a silica to cation molar ratio (X) of the composition is defined by the equation:

$$X = \frac{N_{silica}}{N_{cations} \times Z^6}$$

wherein X is between about 8 and about 50, $N_{silica}$ is the total number of moles of silica in the composition, $N_{cations}$ is the total number of moles of cations in the composition, and Z is the charge on the cation; and
wherein the composition is present in a subterranean zone and has a gelling time of between 1 hour and 48 hours at a temperature of between 90° C. and 200° C.

29. The composition of claim 28, wherein the organosilane moiety comprises a silicon atom bound to one, two, or three $R^1$ groups by a direct Si—C bond, wherein:
each $R^1$ is independently selected from the group consisting of i) alkyl, ii) epoxy alkyl, iii) alkenyl, iv) aryl, v) heteroaryl, vi) $C_{1-6}$ alkylaryl, and vii) $C_{1-6}$ alkylheteroaryl, any of which are optionally substituted with one or more groups selected from among $ER^2$, isocyanate, and isocyanurate;
E is absent or is a linking group selected from the group consisting of —O—, —S—, —OC(O)—, —C(O)—, —C(O)O—, —C(O)OC(O)—, —N($R^3$)—, —N($R^3$)C(O)—, —N($R^3$)C(O)N($R^3$)—, and —C(O)N($R^3$)—;
$R^2$ is selected from the group consisting of hydrogen, F, Cl, Br, alkyl, alkenyl, aryl, heteroaryl, $C_{1-3}$ alkylaryl, and $C_{1-3}$ alkylheteroaryl, and is optionally substituted with one or more groups selected from the group consisting of hydroxyl, F, Cl, Br, epoxy, —$OR^3$, and —N($R^3$)$_2$; and
$R^3$ is H or $C_{1-6}$ alkyl.

30. The composition of claim 29, wherein $R^1$ is a hydrophilic moiety or becomes hydrophilic after hydrolysis.

31. The composition of claim 30, wherein $R^1$ comprises a member selected from the group consisting of carboxyl, ester, epoxy, acyloxy, ketone, aldehyde, (meth)acryloxy, amido, hydroxyl, thiol, amino, ureido, isocyanate, and isocyanurate.

32. The composition of claim 29, wherein $R^1$ comprises an epoxy group or one or more hydroxyl groups.

33. The composition of claim 32, wherein $R^1$ comprises an $ER^2$ substituent, wherein E is —O— and $R^2$ is selected from the group consisting of $C_{1-8}$-epoxyalkyl, substituted-$C_{1-8}$-epoxyalkyl, and a hydroxyl-substituted alkyl.

34. The composition of claim 29, wherein $R^1$ is a hydrophilic group comprising at least one heteroatom selected from O and N, and comprising no more than three consecutive alkylene ($CH_2$) groups.

35. The composition of claim 34, wherein $R^1$ is selected from the group consisting of 3-glycidoxypropyl, 2,3-dihydroxypropoxypropyl, 2,3-dihydroxypropyl, and 2,3-dihydroxypropoxypropyl.

36. The composition of claim 29, wherein the modified colloidal silica is prepared by contacting the unmodified colloidal silica with an organosilane reactant, wherein the organosilane reactant is selected from the group consisting of a compound having the formula $T_{4-y}Si—[R^1]_y$, a siloxane having the formula $[R^1]_b T_{3-b}Si\{—O—SiT_{2-c}[R^1]_c\}_a—O—SiT_{3-b}[R^1]_b$, and a disilazane having the formula $\{[R^1]_b T_{3-b}Si\}_2—NH$, wherein:
y is from 1 to 3;
each a is independently from 0 to 5;
each b is independently from 1 to 3;
c is 1 or 2; and
each T is independently selected from the group consisting of halide, hydroxyl, $C_{1-6}$ alkoxy, and $C_{1-6}$ haloalkoxy.

37. The composition of claim 28, wherein the accelerator comprises one or more members selected from the group consisting of halides, silicates, sulfates, nitrates, carbonates, carboxylates, oxalates, sulfides, and hydroxides.

38. The composition of claim 28, wherein a cation of the one or more cations of the accelerator is selected from the group consisting of alkali metal ions, alkaline earth metal ions, hydrogen ions, ammonium ions, primary organoammonium ions, secondary organoammonium ions, tertiary organoammonium ions, and quaternary organoammonium ions.

39. The composition of claim 28, wherein a cation of the one or more cations of the accelerator is monovalent.

40. The composition of claim 28, wherein the accelerator is selected from the group consisting of sodium silicate, potassium silicate, sodium chloride, and sodium hydroxide.

41. The composition of claim 28, wherein the accelerator is present in an amount of between about 1 and about 30 wt % of the composition.

42. The composition of claim 28, wherein a silica content of the composition is between about 3 and about 55 wt % of the unmodified silica.

43. The composition of claim 28, wherein the accelerator is present in an amount of between about 1 and about 30 wt % of the composition and a silica content of the composition is between about 3 and about 55 wt % of the unmodified silica.

* * * * *